(12) United States Patent
Kangas et al.

(10) Patent No.: US 8,134,990 B2
(45) Date of Patent: Mar. 13, 2012

(54) DEFINING ADAPTIVE DETECTION THRESHOLDS

(75) Inventors: Ari Kangas, Lindingö (SE); Iana Siomina, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/961,037

(22) Filed: Dec. 6, 2010

(65) Prior Publication Data

US 2011/0143773 A1 Jun. 16, 2011

Related U.S. Application Data

(60) Provisional application No. 61/286,049, filed on Dec. 14, 2009.

(51) Int. Cl.
*H04B 7/216* (2006.01)
(52) U.S. Cl. ........ 370/342; 370/350; 370/441; 455/456; 375/152
(58) Field of Classification Search .......... 370/335–337, 370/342, 350, 441; 455/456, 422.1, 561, 455/550.1; 375/152
See application file for complete search history.

(56) References Cited

U.S. PATENT DOCUMENTS 7,075,974 B2 * 7/2006 Ohsuge .......................... 375/152
7,286,519 B2 * 10/2007 Eppinger et al. .............. 370/342

FOREIGN PATENT DOCUMENTS

WO    WO 2011/073859 A2    6/2011

OTHER PUBLICATIONS

R1-093626; 3GPP TSG RAN WG4 Meeting #52Shenzhen, China, Oct. 2-16, 2009.
R4-093908; 3GPP TSG RAN WG4 Meeting #58 Shenzhen, China, Aug. 24-28, 2009.
3GPP TS 36.211 v9.1.0, Mar. 30, 2010, Evolved Universal Terrestrial Radio Access (E-UTRA); Physical channels and modulation.
3GPP TS 36.355 v9.2.1 Jun. 6, 2010, Evolved Universal Terrestrial Radio Access (E-UTRA); LTE Positioning Protocol (LPP).

* cited by examiner

*Primary Examiner* — Phuoc Doan
(74) *Attorney, Agent, or Firm* — Nixon & Vanderhye, P.C.

(57) ABSTRACT

A wireless device (24) receives a reference signal over a radio channel (21). The reference signal may be Positioning Reference Signals (PRS) and/or Common Referencing Signals (CRS), and may be transmitted from a transmitter (22). The wireless device (24) comprises a correlator (100); a reference signal detector (102); a threshold selector (106); and a reference signal analyzer (108). The correlator (100) use a signal received from the radio channel (21) and a replica of the reference signal to provide a correlator output value. The reference signal detector (102) compares the correlator output value with a threshold value to detect presence of a reference signal, and to estimate an arrival time of the reference signal. The threshold selector (106) adapts the threshold value to at least an estimate of a relative amount of noise and interference power in the received signal.

31 Claims, 18 Drawing Sheets

Antenna port 6

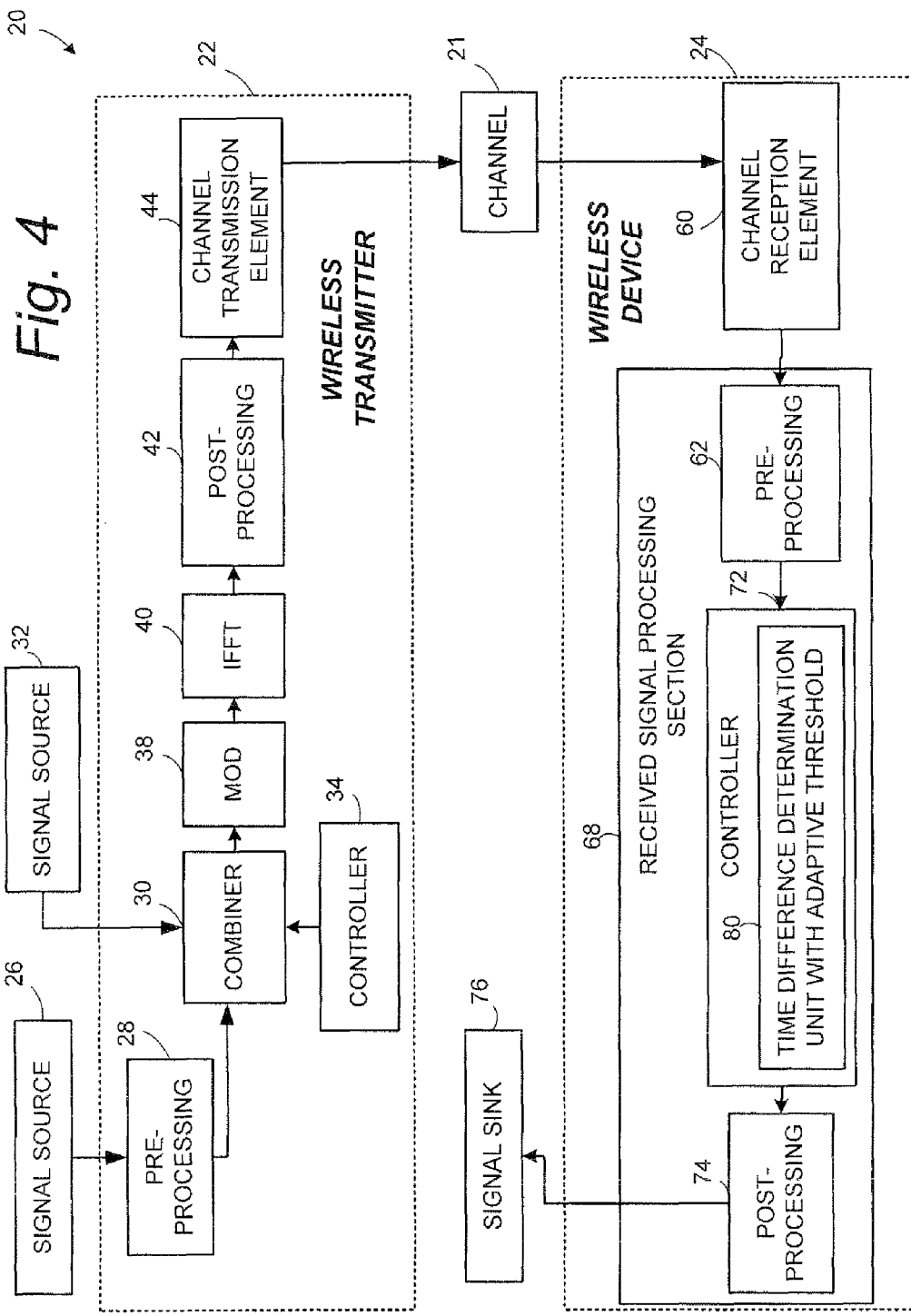

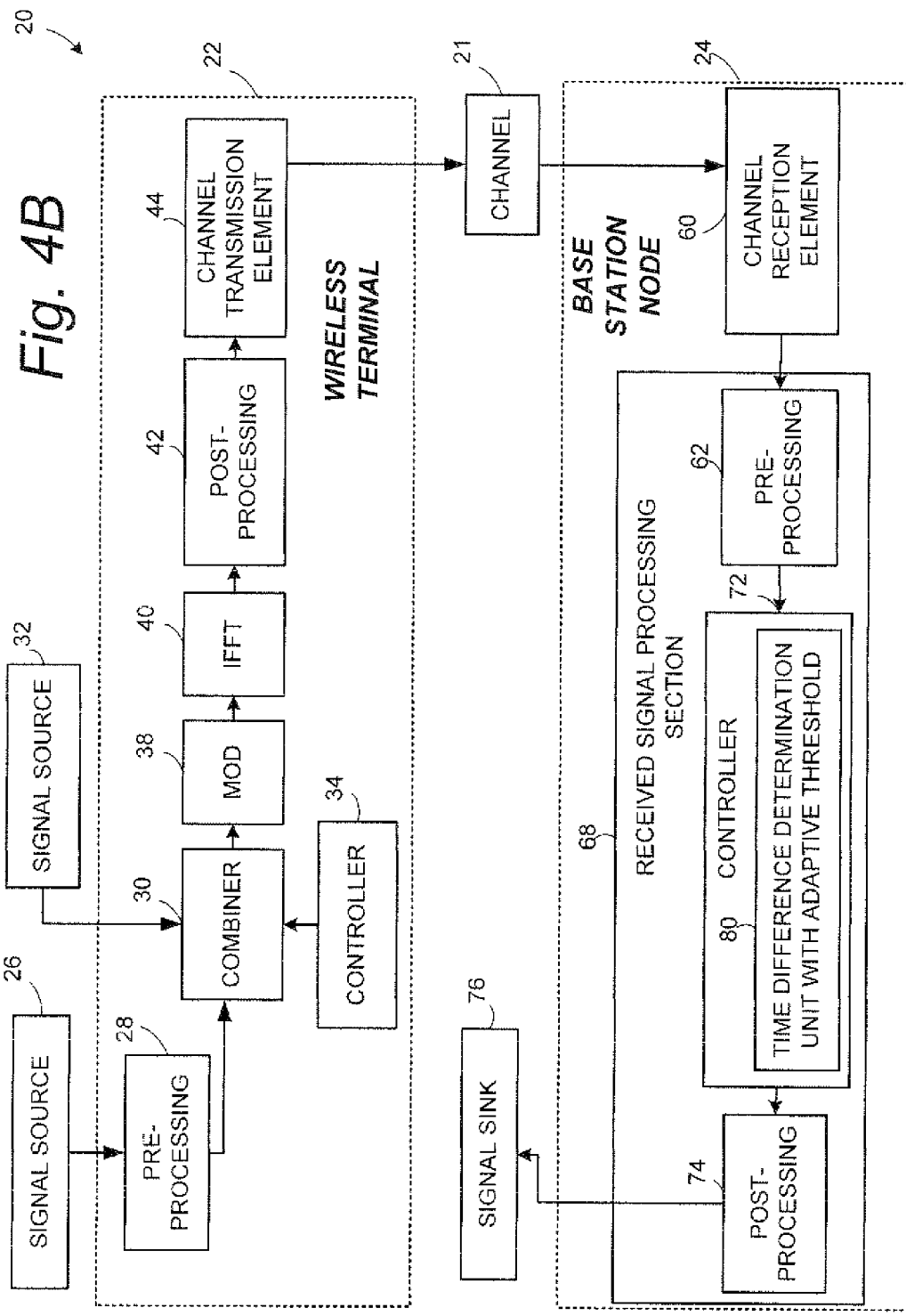

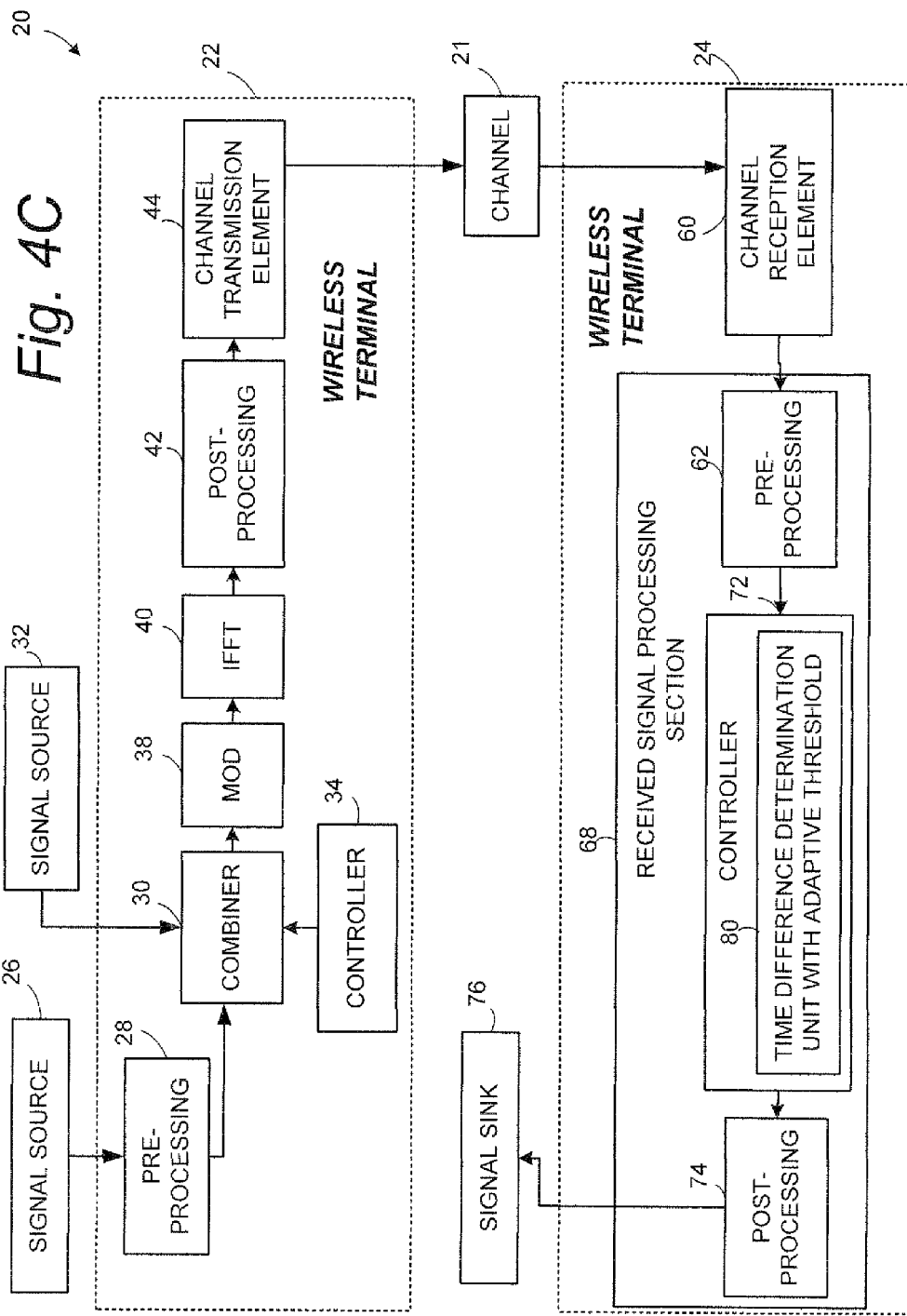

DEFINING ADAPTIVE DETECTION THRESHOLDS

This application claims the benefit and priority of U.S. Provisional Patent Application 61/286,049 filed Dec. 14, 2009, which is incorporated herein by reference in its entirety.

BACKGROUND

The present invention generally relates to signal detection in wireless communications networks, and in particular to wireless network architectures that utilize signal measurements from multiple cells for positioning, locating, and location-based services.

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM). UTRAN is essentially a radio access network using wideband code division multiple access for user equipment units (UEs).

In a forum known as the Third Generation Partnership Project (3GPP), telecommunications suppliers propose and agree upon standards for third generation networks and UTRAN specifically, and investigate enhanced data rate and radio capacity. The Third Generation Partnership Project (3GPP) has undertaken to evolve further the UTRAN and GSM based radio access network technologies. Specifications for the Evolved Universal Terrestrial Radio Access Network (E-UTRAN) are ongoing within the $3^{rd}$ Generation Partnership Project (3GPP). The Evolved Universal Terrestrial Radio Access Network (E-UTRAN) comprises the Long Term Evolution (LTE) and System Architecture Evolution (SAE).

Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

Some radio access technologies have the capability of identifying user geographical location in the network, e.g., discerning or determining the geographical location of a wireless terminal or user equipment unit (UE). The ability to determine geographical location has facilitated or enhanced a large variety of commercial and non-commercial services. Such services include, by way of example, navigation assistance, social networking, location-aware advertising, emergency calls, etc.

Of the services that utilize or capitalize upon geographical location, different services may have different positioning accuracy requirements. These differing positioning accuracy requirements may be imposed by the particular application that provides the respective service. In addition, some countries have specific regulatory requirements relating to positioning accuracy for basic emergency services, such as (for example) FCC E911 in the United States of America. Such governmental or other regulatory requirement(s) may impose additional constraints on the desired quality of the positioning service.

Currently there exists a wide range of positioning methods. Many of the current positioning methods in one or another way involve timing measurements. Furthermore, some of the current positioning methods are based on a multilateration technique. The multilateration technique is a way to determine a geometrical position from intersection of multiple surfaces, e.g., spheres or hyperboloids. Such an intersectional approach requires measurements from multiple sites with good geometry. In fact, for an intersectional approach ideally at least three such sites are necessary to determine a two-dimensional position and four sites to determine a three dimensional position. In practice these requirements mean that a user equipment unit (UE) needs to measure significantly more cells because some of them are co-located or have bad geometry.

FIG. 1A and FIG. 1B illustrate, at least in part, a downlink Observed Time Difference Of Arrival method (OTDOA) method which has been standardized by 3GPP for LTE. In FIG. 1A each hyperbola illustrates an area with a same level of the reference signal time difference (RSTD) for two base stations. The terminal (e.g., wireless terminal) measures the timing differences of multiple base stations. At least three measurements from geographically dispersed base stations with a good geometry are needed to solve for two coordinates of the terminal and the receiver clock bias. In FIG. 1B intersection of three hyperbolic stripes provides an estimation of a wireless terminal location. In order to solve for position, precise knowledge of the transmitter locations and timing is needed. With OTDOA, unlike with measuring time of arrival (TOA), synchronization between base stations and terminals is not needed.

To enable positioning in LTE and to facilitate positioning measurements of a proper quality and for a sufficient number of distinct locations, new physical signals dedicated for positioning (positioning reference signals, or PRS) have been introduced and specific positioning subframes have been agreed in 3GPP. See, e.g., 3GPP TS 36. 211 (Rel-9, B), which is incorporated herein by reference. It is, however, left up to user equipment unit (UE) to decide whether to use or not PRS for positioning measurements.

At least on the downlink LTE uses orthogonal frequency division multiplexing (OFDM), wherein data is simultaneously encoded over various sub-carriers. A data stream is split into N parallel streams of reduced data rate and each parallel stream is transmitted on a separate sub-carrier. When the subcarriers have appropriate spacing to satisfy orthogonality (e.g., the sub-carriers' frequencies differ from each other by integer multiples of the base (lowest) sub-carrier frequency), the carriers are mutually orthogonal to each other and their spectra overlap. FIG. 2 illustrates a time-frequency plane of an Orthogonal Frequency Division Multiplexing (OFDM) system wherein symbols are modulated onto orthogonal time-frequency units (illustrated by way of example as the squares of FIG. 2) defined by the sub-carriers of an OFDM symbol.

In accordance with the 3GPP agreements, Positioning Reference Signals (PRS) are transmitted from one antenna port (R6) according to a pre-defined pattern. The specified PRS pattern for the case when one or two Physical Broadcast Channel (PBCH) antennas are in use is shown in FIG. 2. In FIG. 2 squares labeled "R6" indicate PRS resource elements within a block of 12 subcarriers over 14 OFDM symbols (e.g., 1 ms subframe with normal cyclic prefix). A set of frequency shifts can be applied to the pre-defined PRS patterns to obtain a set of orthogonal patterns which can be used in neighbor cells to reduce interference on PRS and thus improve positioning measurements. The effective frequency reuse of six can be modeled in this way. The frequency shift is defined as a function of Physical Cell ID (PCI) as $v_{shift}=\text{mod}(PCI,6)$ PRS can also be transmitted with zero power, or muted.

To improve hearability of the physical reference signal (PRS), e.g., to allow for detecting the PRS from multiple sites and at a reasonable quality, positioning subframes have been designed as low-interference subframes. For example, it has also been agreed that (in general) no data transmissions are allowed in positioning subframes. As a result, in synchronous networks, PRS are ideally interfered only by PRS from other cells having the same PRS pattern index (i.e. same vertical shift $v_{shift}$) and not by data transmissions.

In contrast to synchronous networks, in partially aligned asynchronous networks PRS can still be interfered by transmissions over data channel(s), control channel(s), or physical signals when positioning subframes collide with normal subframes. This interference effect can be minimized by partial alignment (e.g., by aligning the beginning of positioning subframes in multiple cells within ½ of a subframe with respect to some time base).

If the user equipment unit (UE) uses PRS for positioning in general but is not able to detect PRS for a cell, it will try to detect Common Reference Signals (CRS) and to perform Reference Signal Time Difference (RSTD) measurements based on the Common Reference Signals (CRS). However, a failure to detect PRS and then searching for the other signals of the same cell increases the cell detection time and may also degrade positioning measurements. This is because Common Reference Signals (CRS) in a typical case have worse hearability than PRS due to a lower effective frequency reuse (namely, 3-reuse when two transmit antennas are used for CRS).

FIG. 3 illustrates that Positioning Reference Signals (PRS) can be transmitted in pre-defined positioning subframes grouped by several consecutive subframes ($N_{PRS}$), i.e. one positioning occasion, which occur periodically with a certain periodicity of N subframes. The periodicity N is the time interval between two positioning occasions. For example, FIG. 3 shows three different groups of positioning subframes, each group of positioning subframes comprising six subframes ($N_{PRS}=6$), and a first subframe of each group of positioning subframes being separated from a first subframe of the next in time group of positioning subframes by N frames. The periods N specified in the 3GPP standard are 160, 320, 640, and 1280 ms, and the number of consecutive subframes $N_{PRS}$ can be 1, 2, 4, or 6 [see, e.g., 3GPP TS 36.211 v9.1.0, Mar. 30, 2010, Evolved Universal Terrestrial Radio Access (E-UTRA); Physical channels and modulation, which is incorporated herein by reference].

Since (for OTDOA positioning) Positioning Reference Signals (PRS) signals from multiple distinct locations need to be measured, the user equipment unit (UE) receiver has to deal with some Positioning Reference Signals that may be much weaker than those received from the serving cell. Furthermore, without the approximate knowledge of when the measured signals are expected to arrive in time and what is the exact PRS pattern, the user equipment unit (UE) would need to search blindly for signals. Blind search would negatively impact the time and accuracy of the measurements.

To reduce blind searching and to facilitate measurements made by the user equipment unit (UE), the network transmits assistance data to the user equipment units. The assistance data which includes, among other information, a neighbor cell list with Physical Cell Identities (PCIs), the number of consecutive downlink subframes $N_{PRS}$, the PRS transmission bandwidth, the expected time of signal arrival, etc. The standardized OTDOA assistance information is specified in 3GPP TS 36.355 v9.2.1 Jun. 6, 2010, Evolved Universal Terrestrial Radio Access (E-UTRA); LTE Positioning Protocol (LPP), which is incorporated herein by reference.

In conventional practice, a wireless terminal comprises a correlation unit which operates in the time domain to correlate a signal propagated through a radio channel with replicas of the positioning reference signal to obtain a correlation sum. A detector compares normalized output of the correlation unit with a threshold value to determine times at which the positioning reference signal is present. Then, assuming a high post-correlation signal to noise ratio (SNR), an estimated arrival time of the positioning reference signal over a particular path of the radio channel is determined from a minimum of the times for which the positioning reference signal is present, subject to constraints which pertain to received power.

As mentioned above, the detector of the wireless terminal compares normalized output of the correlation unit with a threshold value to determine times at which the positioning reference signal is present. Hopefully selection of the threshold value achieves an appropriate compromise between detection probability and probability of false alarms (e.g., false alarms in locating the arrival time of the positioning reference signal). False alarms are detrimental to positioning performance and are in most cases difficult to correct. In some cases it has been known to make assumptions regarding statistics of a noise term used by the correlation unit in obtaining its correlation sum. For example, it has been assumed in some prior art practice that the received signal consists of the desired signal plus additive Gaussian noise.

SUMMARY

In some of its various aspects the technology disclosed herein dynamically adapts threshold settings used for detecting signals to the characteristics of the noise/interference, and advantageously provides thresholds for all possible system settings (e.g., desired false alarm rates, number of measured eNBs, bandwidths, coherent and non-coherent integration lengths). The technology disclosed herein beneficially provides an analytical technique for determining thresholds in presence of a dominant interfering signal of a known modulation. The known modulation at least in some embodiments comprises QPSK, however, the main principles disclosed herein are neither limited to QPSK nor to any particular reference signal.

In one of its aspects the technology disclosed herein concerns a receiving wireless device which receives a reference signal over a radio channel. The reference signal may be Positioning Reference Signals (PRS) and/or Common Referencing Signals (CRS), and may be transmitted from a transmitter (e.g., a base station or other node(s) including beacon devices and other transmitting wireless devices, which may or may not belong to the network of the wireless device). The receiving wireless device comprises a correlator; a reference signal detector; a threshold selector; and a reference signal analyzer. The correlator is configured to use a signal received from the radio channel and a replica of the reference signal to provide a correlator output value indicating a cross-correlation with the signal received from the radio channel and the replica of the reference signal. The reference signal detector is configured to compare the correlator output value with a threshold value to detect presence of a reference signal, and to estimate an arrival time of the reference signal. The threshold selector is configured to adapt the threshold value to at least an estimate of a relative amount of noise and interference power in the received signal.

In embodiments encompassed herein the wireless device is "positioned". Furthermore, a positioning function may be situated, e.g., either at a core network node (e.g., e-SMLC or SLP) in case of network-based positioning or UE-assisted positioning, or at a wireless terminal, which correspond to UE-based positioning. Moreover, a device that is being positioned may either be a receiving wireless device, e.g. in UE-assisted positioning or UE-based positioning or with terminal-to-terminal communication, or a transmitting wireless device, e.g., in network-based positioning or with terminal-to-terminal communication. The wireless device being positioned may comprise a UE, a wireless terminal, a small base station, a beacon device, a sensor, or other node equipped at least with a radio interface. It is also known to the skilled in the art that the positioning functionality may be in the wireless device being positioned (e.g. UE-based positioning) or in other network node (e.g. E-SMLC or SUPL Location Platform SLP in LTE).

The reference signal analyzer is configured to use at least the reference signal for positioning measurement to be used to determine a geographical location of the transmitting wireless device in some embodiments (e.g. network-based positioning or with terminal-to-terminal communication) or the receiving wireless device in other embodiments (e.g. UE-assisted positioning or with terminal-to-terminal communication).

In one example embodiment, the correlator is configured to determine a correlation sum in a time domain to use the correlation sum to derive the correlator output value. In another example embodiment, the correlator is configured to determine the correlation sum in a frequency domain and to use the correlation sum to derive the correlator output value.

In an example embodiment the threshold selector is configured to adapt the threshold value to at least an estimate of a relative amount of noise and interference power in the received signal by performing an interpolation between a pure noise threshold and a pure interference threshold. For example, the threshold selector may perform the interpolation as a linear interpolation or as an interpolation in the logarithmic domain. In an example implementation, the threshold selector is configured to adapt the threshold value by performing a noise-weighted interpolation between a pure noise threshold and a pure interference threshold using at least an estimate of a noise weight factor. In an example implementation, the noise weight factor is based on at least an estimate of a normalized fourth moment of the channel-propagated signal from the radio channel.

In another example embodiment, the threshold selector is configured to adapt the threshold value to the at least the estimate of the relative amount of noise and interference power in the received signal by scaling and convolving a quantized Gaussian distribution with a scaled binomial distribution.

The methods and procedures disclosed herein are not limited to signals used for positioning measurements.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4 is a schematic view of an orthogonal frequency division multiplexing (OFDM) system according to an example generic embodiment, including an OFDM transmitter and an OFDM receiver.

FIG. 4B is a non-limiting schematic view of an orthogonal frequency division multiplexing (OFDM) system wherein the OFDM transmitter is provided at a wireless terminal and the OFDM receiver is at a base station node.

FIG. 4C is a non-limiting schematic view of an orthogonal frequency division multiplexing (OFDM) system wherein the OFDM transmitter is provided at one wireless terminal and the OFDM receiver is at another wireless terminal.

DETAILED DESCRIPTION

Figure 1B:
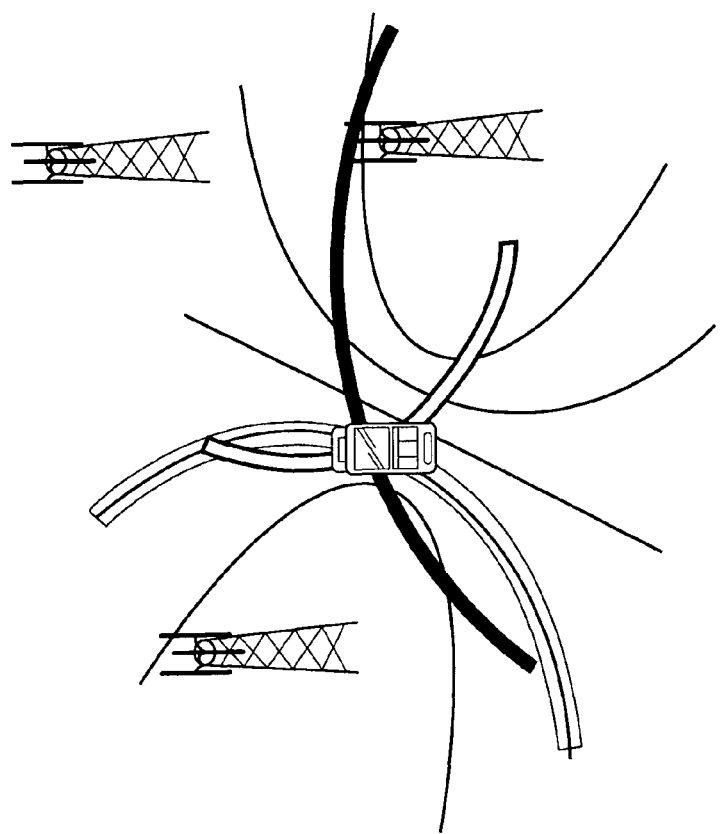
FIG. 1A and FIG. 1B are diagrammatic views illustrating, at least in part, a downlink Observed Time Difference Of Arrival method (OTDOA), in FIG. 1a each hyperbola illustrating an area with a same level of the reference signal time difference (RSTD) for two base stations; and in FIG. 1b intersection of three hyperbolic stripes providing an estimation of a wireless device location.
Figure 1A:
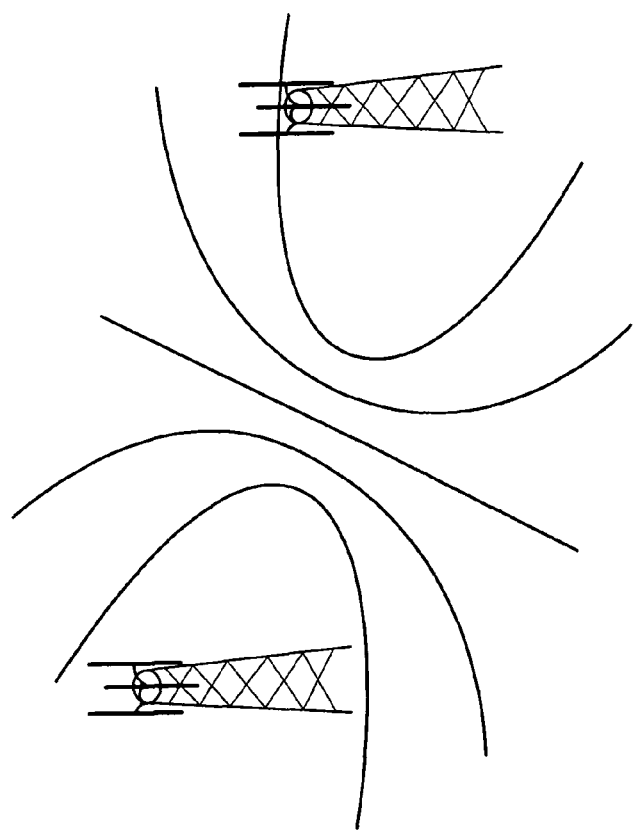

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

1.0 Example Systems and Terminals

FIG. 4 shows an example, non-limiting embodiment of communication system 20 wherein transmissions occur over a radio channel 21 from transmitter 22 to wireless device 24. The transmitter 22 of communication system 20 of FIG. 4 receives signals from signal source 26. The signals obtained from source 26 may be of many types, such as user data signals (obtained, e.g., from the serving cell) and/or signals used for positioning measurement(s). Optionally, and depending on the particular implementation, transmitter 22 comprises a pre-processing section 28 which can manipulate the signals obtained from signal source 26 by performing such optional functions as serial-to-parallel conversion and channel coding and interleaving. The transmitter 22 comprises combiner 30 which combines the signals (which may be optionally coded and/or interleaved) with other signals such as control signals, synchronization signals, framing signals, and pilot signals. In FIG. 4, such control signals, synchronization signals, framing signals, and pilot signals are shown as being applied or received from another signal source 32.

The combiner 30, which can be a multiplexer or function as a multiplexer, generates a bit stream by controlled introduction of the signals from source 32 into the stream of signals from source 26. Control of introduction of the signals, including pilot signals, is achieved by controller 34.

When the transmitter 22 is an orthogonal frequency division multiplexing (OFDM) transmitter, the bit stream output by combiner 30 is modulated by modulator 38 onto a series of sub-carriers. As understood by those skilled in the art, the modulation performed by modulator 38 essentially maps groups of bits to a series of constellation points, represented as complex numbers. A parallel-to-serial conversion may be performed on the complex numbers output by modulator 38 prior to application to Inverse Fast Fourier Transform (IFFT) unit 40.

The Inverse Fast Fourier Transform (IFFT) unit 40 transforms the modulated carriers into a sequence of time domain samples. The sequence of time domain samples output by Inverse Fast Fourier Transform (IFFT) unit 40 may undergo more processing functions by an optional post-processor 42. Such post-processing functions can include one or more of cyclic extension, windowing, peak control, all of which are understood by the person skilled in the art. The resultant OFDM waveform is applied to channel transmission element 44. The channel transmission element 44, which can be an antenna or antenna system, for example, applies the OFDM waveform (I, Q output or digital IF signals) to radio channel 21.

One example non-limiting implementation of communication system 20 is in context of a cellular transmission system in which wireless communications occur between a radio access node such as a base station (also called a Node-B or eNodeB), for example, and a wireless terminal or mobile unit (often also termed a mobile station, a mobile terminal, or a user equipment unit (UE), among other appellations). In a wireless system, the wireless terminal, can be embodied in or realized as mobile stations such as mobile telephones ("cellular" telephones) and laptops with mobile termination, and thus can be, for example, portable, pocket, hand-held, computer-included, or car-mounted mobile devices which communicate voice and/or data with radio access network. The signal (e.g., the OFDM waveform) is transmitted over channel 21, which has its own transmission function (as affected by properties of the channel and factors such as noise and interference, for example).

Figure 4A:
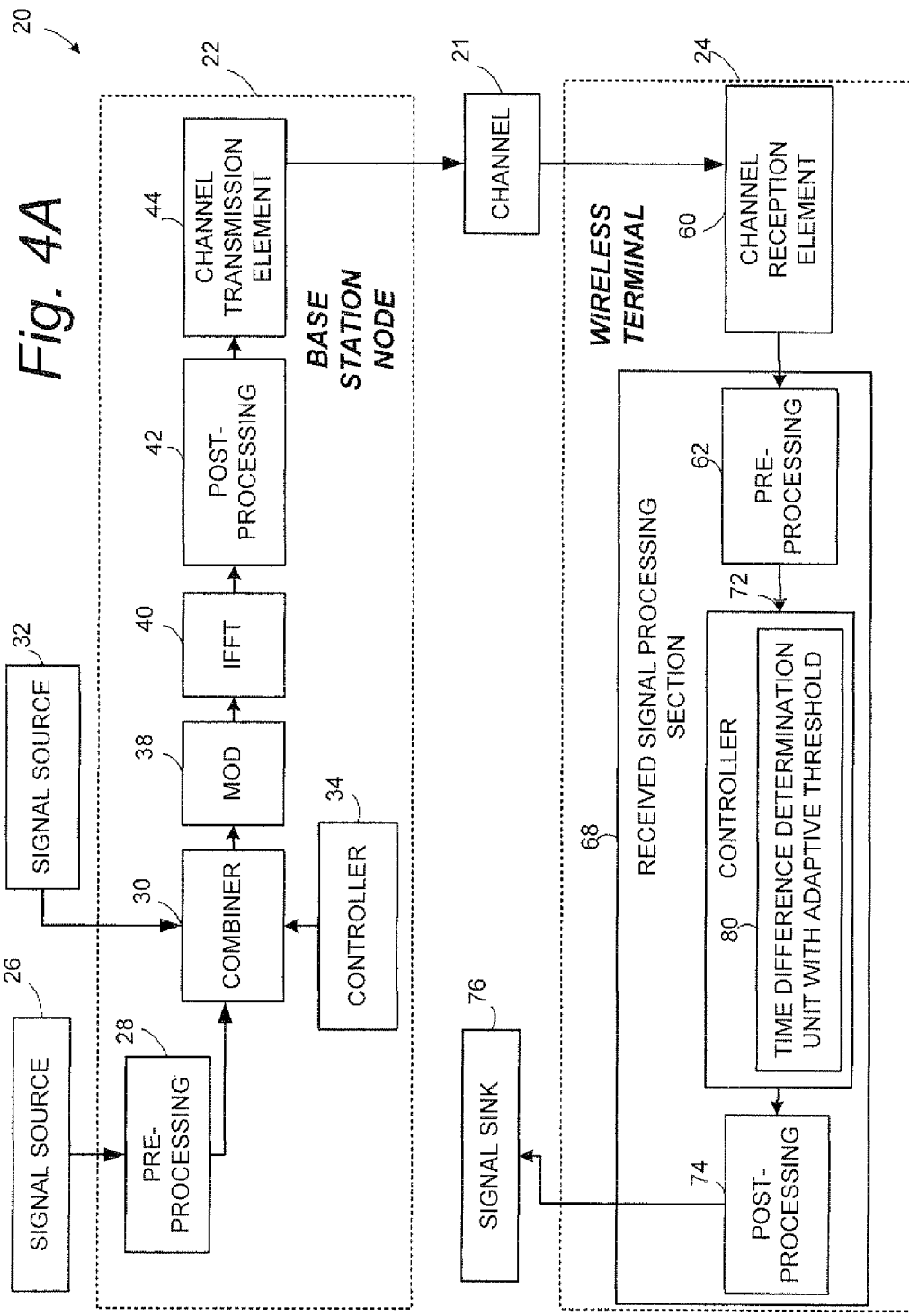
FIG. 4A is a non-limiting schematic view of an orthogonal frequency division multiplexing (OFDM) system wherein the OFDM transmitter is provided at a base station node and the OFDM receiver is at a wireless terminal.

Being in a wireless or radio network, the wireless device 24 may be embodied in or realized by a node of a radio access network (such as a base station (BS) node or an eNodeB, for example) or a wireless terminal (UE). For example, FIG. 4A illustrates a situation in which the transmitter 22 is a base station node which transmits on a downlink to a wireless device 24 which takes the form of a wireless terminal (e.g., a user equipment unit (UE) or mobile station as described above). FIG. 4B illustrates a converse situation in which the transmitter 22 is a wireless terminal which transmits on an uplink to a wireless device 24 which takes the form of a base station node. FIG. 4C illustrates a yet further situation in which both the transmitter 22 and the wireless device 24 takes the form of wireless terminals, and in which the technology disclosed herein is applicable to both the uplink (UL) and downlink (DL) transmissions. FIG. 4C thus illustrates that the technology disclosed herein applies to general terminal-to-terminal communication as well, which can be viewed as either uplink (UL) or downlink (DL) or a mix of downlink (DL) and uplink (UL). Moreover, some network nodes, e.g., relay nodes, may also transmit either on the downlink (DL) like a base station and on the uplink (UL) like a wireless terminal. Thus, the term "wireless device" is employed generically herein to refer to either a wireless terminal or a radio access network node or another network node such as a relay node, and which can receive information over the radio channel 21 either on the downlink (DL) [e.g., in the case of the wireless device being a wireless terminal] or on the uplink (UL) [e.g., in the case of the wireless device being a radio access network node].

In the embodiments encompassed herein, such as the non-limiting embodiments of FIG. 4A, FIG. 4B, and FIG. 4C, it is the wireless device that is being positioned. Furthermore, the positioning function may be situated, e.g., either at a core network node (e.g., e-SMLC or SLP) in case of network-based positioning or UE-assisted positioning, or at a wireless terminal, which correspond to UE-based positioning.

As used herein, a device that is being positioned may either be a receiving wireless device (e.g. in UE-assisted positioning or UE-based positioning or with terminal-to-terminal communication) or a transmitting wireless device (e.g., in network-based positioning or with terminal-to-terminal communication). The wireless device being positioned may comprise a UE, a wireless terminal, a small base station, a beacon device, a sensor, or other node equipped at least with a radio interface. It is also known to the skilled in the art that the positioning functionality may be in the wireless device being positioned (e.g. UE-based positioning) or in other network node (e.g. E-SMLC or SUPL Location Platform SLP in LTE).

Moreover, the techniques described herein apply to all time base methods, not just Long Term Evolution (LTE), whether uplink or downlink based. For example, the technology disclosed herein may apply to other radio access technologies such as LTE TDD, LTE FDD, LTE evolutions, WiMAX, and WLAN.

FIG. 4 also shows some aspects of the example, non-limiting embodiment of wireless device 24. The wireless device 24 comprises channel reception element 60, which can be an antenna or antenna system. The signal received by channel reception element 60 (which can be an OFDM waveform with I, Q input or digital IF signals) as received by channel reception element 60 is applied to an optional pre-processing section 62. The pre-processing section 62 removes carrier offset caused by transmit and receiver local oscillator differences and selects an appropriate sequence of samples to apply to other elements of signal processing section 68.

The received signal processing section 68 comprises controller 72. The controller 72 serves, e.g., to sort user data signals from non-user data signals, and to process the non-user data signal. User data signals gated out of controller 72 can be applied to an optional post-processing section 74. The post-processing section 74 can perform such functions as channel decoding, de-interleaving, and parallel-to-serial conversion, as appropriate. The user data thusly obtained is applied to user signal sink 76, which can be a voice, text, or other type of application, for example. Included with the signals are reference signals which are handled by time difference determination unit 80. The reference signals (RF) can be of any appropriate type, such as Positioning Reference Signals (PRS) or Common Reference Signals (CRS), for example. The time difference determination unit 80, which comprises controller 72, serves, e.g., to determine the presence of the reference signals by comparing correlator outputs with a threshold, and further determines the arrival time of the reference signals. By virtue of the fact that time difference determination unit 80 adaptively selects its comparison threshold in dependence upon noise and interference, the time difference determination unit 80 is also referred to as time difference determination unit with adaptive threshold.

Figure 5:
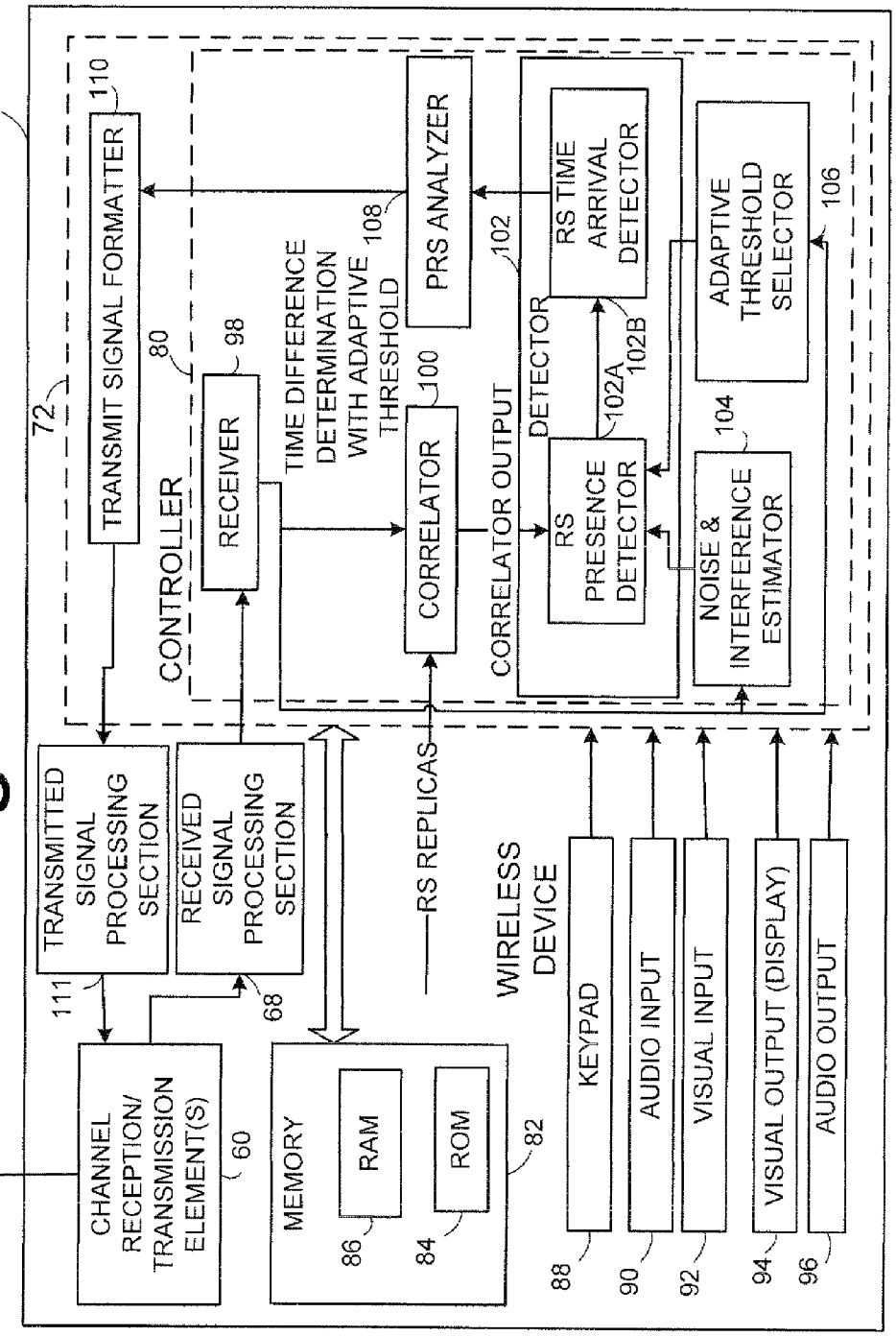
FIG. 5 is a schematic view of selected hardware and functionalities of an example wireless device.

FIG. 5 shows the wireless device 24 from other perspectives, both in terms of hardware and certain illustrated functionalities of the controller 72 including time difference determination unit 80. In terms of hardware, FIG. 5 illustrates, as non-exhaustive further example components of receiver 24, various input/output units and memory 82. The memory 82 can comprise, for example, read only memory (ROM) 84 and various forms of random access memory (RAM) 86, and can also be used for storing coded instructions which are executed by controller 72 in conjunction with operations described herein. Certain representative input/output units are illustrated as being keypad 88; audio input device (e.g. microphone) 90; visual input device (e.g., camera) 92; visual output device (e.g., display 94); and audio output device (e.g., speaker) 96.

FIG. 5 further shows functionalities of time difference determination unit 80 as comprising receiver 98; correlator 100; reference signal detector 102; noise and interference power estimator 104; adaptive threshold selector 106; and reference signal analyzer 108. The receiver 98 is connected to receive output from received signal processing section 68, e.g., to receive channel-propagated signals from the radio channel 21 and to obtain therefrom delayed output signals. The correlator 100 is connected and configured to use the delayed output signals of the receiver 90 and replicas of the reference signal to provide correlator output values indicating a cross-correlation with the signal received from the radio channel and the replica of the reference signal. In particular embodiments, replicas of the reference signal may be obtained or reconstructed from the cell identifier (cell ID) which the wireless device is supposed to know (e.g., from the assistance data), but in general the replicas can also be transmitted, e.g., with the assistance data.

The reference signal detector 102 is connected and configured to receive the correlator output values from correlator 100, divide these values by the scaled noise and interference power estimate obtained from 104, and compare the resulting values with a threshold value selected by adaptive threshold selector 106 to detect presence of a reference signal, and to estimate an arrival time of the reference signal. To this end, FIG. 5 shows reference signal detector 102 as comprising presence detector section 102A and RS arrival time detection section 102B.

The adaptive threshold selector 106 is connected to the receiver 98 and configured to at least an estimate of the relative amount of noise and interference power in the received signal. The adaptive threshold selector 106 uses the relative amount of noise and interference power in the received signal, or at least an estimate of the relative amount of noise and interference power in the received signal, to determine the adaptive threshold value which it applies to reference signal detector 102. As used herein, "at least an estimate" of a particular value or quantity should be understood to encompass not only an estimate of the value or quantity, but a more exacting determination of the value or quantity as well.

The reference signal analyzer 108 is connected and configured to use at least the reference signal (whose presence and arrival time is detected by reference signal detector 102) to determine a geographical location of the wireless device 24. Thus, in the FIG. 5 embodiment the positioning functionality is in the wireless device being positioned (e.g. UE-based positioning) In LTE, location determination in the wireless device can be done for so-called UE-based OTDOA positioning, which is not yet standardized in LTE, or UE-based GNSS.

In other embodiments, the positioning functionality is not in the wireless device 24 being positioned, but in another network node (e.g. E-SMLC or SUPL Location Platform SLP in LTE). In such case, the standardized way to determine a geographical location of the wireless device is to report the timing measurements (reference signal time difference [RSTD]) to the evolved-Serving Mobile Location Center (e-SMLC) using the LPP protocol, e.g., 3GPP TS 36.355 v9.2.1 Jun. 6, 2010, Evolved Universal Terrestrial Radio Access (E-UTRA); LTE Positioning Protocol (LPP), which is incorporated herein by reference. The currently discussed but not yet standardized positioning method using UL timing measurement (UTDOA, UL Time Difference Of Arrival), which is a network-based positioning method, implies reporting the measurements over LPPa (LPP Annex) protocol from the radio network node such as eNodeB to the positioning node such as E-SMLC or SLP in LTE.

FIG. 5 further shows that the wireless device 24 further comprises a formatter 110 which formats information for transmission from the wireless device 24, as well as a transmitted signal processing section 111 which applies signals to be transmitted to the channel reception/transmission element(s) 60.

2.0 Correlation

Figure 6A:
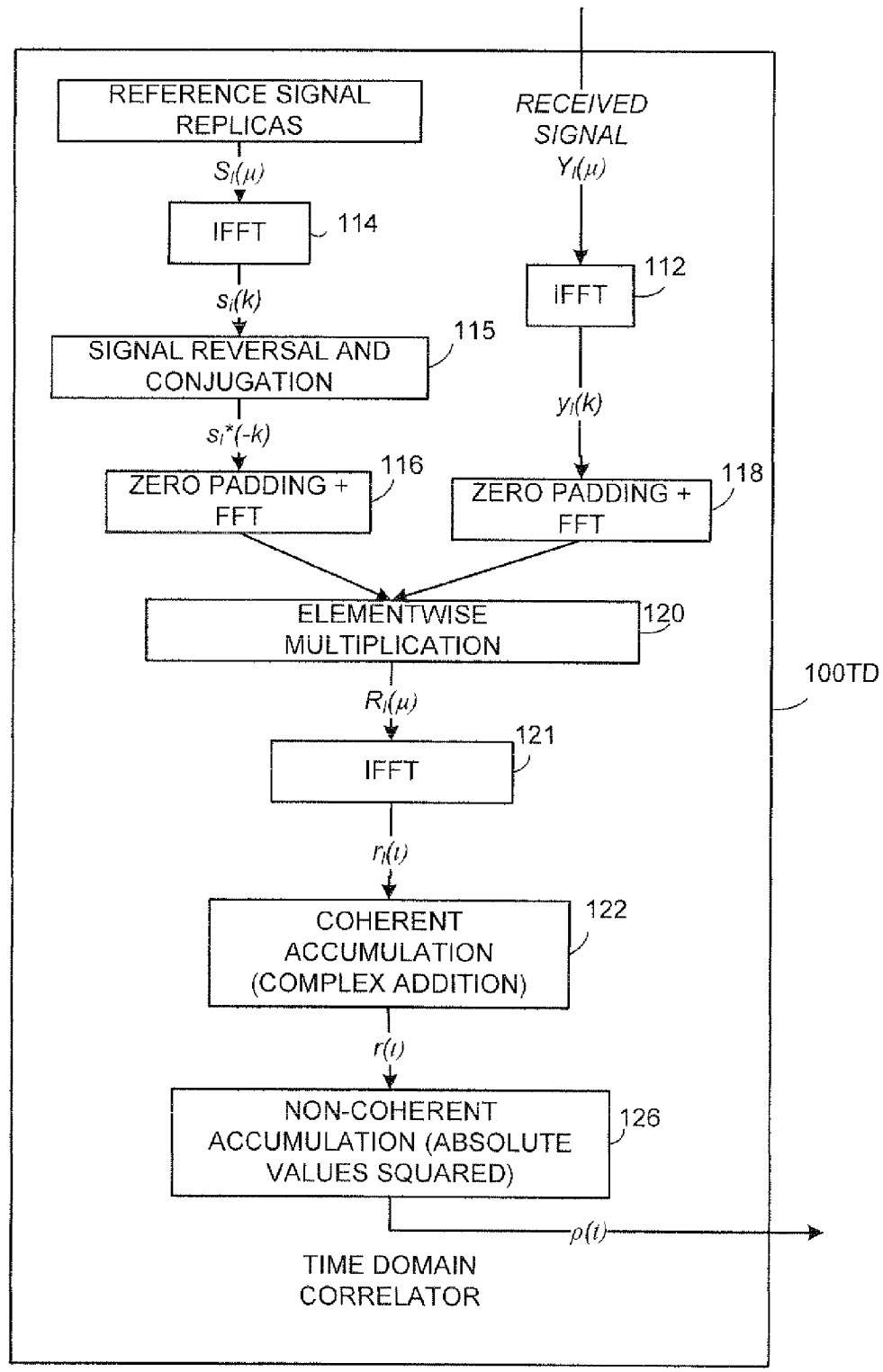
FIG. 6A is a schematic view illustrating an example embodiment of a correlator configured to determine correlation sums in a time domain and to use the correlation sums to derive correlator output values.

In one example embodiment understood with reference to FIG. 6A, correlator 100TD is configured to determine correlation sums in a time domain to use the correlation sums to derive the correlator output values. In another example embodiment understood with reference to FIG. 6B, correlator 100FD is configured to determine correlation sums in a frequency domain and to use the correlation sums to derive the correlator output values.

2.1 Correlation in the Time Domain

The correlator 100TD of FIG. 6A comprises Inverse Fast Fourier Transform (IFFT) unit 112; Inverse Fast Fourier Transform (IFFT) unit 114; signal reversal and conjugation unit 115; Fast Fourier Transform (FFT) unit 116; Fast Fourier Transform (FFT) unit 118; element wise multiplication unit 120; Inverse Fast Fourier Transform (IFFT) 121 unit; coherent accumulation (complex addition) unit 122; and non-coherent accumulation unit 126. The Inverse Fast Fourier Transform (IFFT) unit 112 is connected and operated to obtain the frequency domain $Y_l(\mu)$ output of receiver 98 and to perform an inverse Fast Fourier Transform and thereby provide the time domain signal $y_l(k)$. The Inverse Fast Fourier Transform (IFFT) unit 114 is connected and operated to provide a time domain version $s_l(k)$ of the replica of the reference signal to signal reversal and conjugation unit 115. Fast Fourier Transform (FFT) unit 116 is then used to add zero padding and take the Fast Fourier Transform of the output $s_1^*(-k)$ of signal reversal and conjugation unit 115. Fast Fourier Transform (FFT) unit 118 is used to add zero padding and take the Fast Fourier transform of signal $y_l(k)$ received from Inverse Fast Fourier Transform (IFFT) 112. The frequency domain outputs of Fast Fourier Transform (FFT) unit 116 and Fast Fourier Transform (FFT) unit 118 are applied to element wise multiplication unit 120, which outputs $R_l(\mu)$ to Inverse Fast Fourier Transform (IFFT) unit 121. Inverse Fast Fourier Transform (IFFT) unit 121 takes the Inverse Fast Fourier transform of signal $R_l(\mu)$ to obtain signal $r_l(t)$, which is applied to coherent accumulation (complex addition) unit 122. The coherent accumulation (complex addition) unit 122 in turn outputs the time domain signal r(t) [also known as a "time domain correlation sum"] to non-coherent accumulation unit (absolute values squared) 126. Non-coherent accumulation unit 126 receives complex-valued r(t), takes the absolute square of each term, and sums the result for all m. The output of non-coherent accumulation unit 126 is the time domain correlator output ρ(t).

Figure 3:
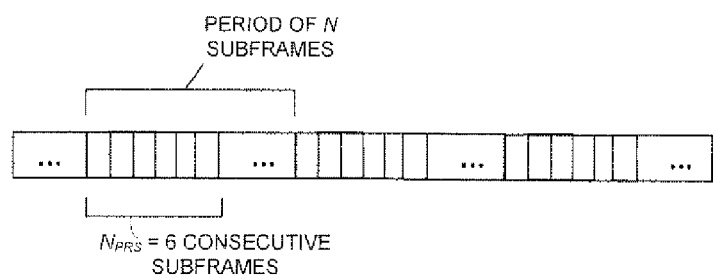
FIG. 3 is a diagrammatic view illustrating reference signals transmitted in predefined positioning subframes grouped by several consecutive subframes ($N_{PRS}$).

As understood from the foregoing and illustrated by FIG. 3, in an example system and embodiment the reference signal (RS, such as PRS or CRS) can be transmitted in $N_{prs}$ consecutive subframes. In the example embodiment the total number of OFDM symbols containing PRS resource elements over all the consecutive subframes is $N_l$.

The operation of time difference determination unit 80 is now described, initially in the context of correlator 100TD of FIG. 6A. In the time domain the signal can be defined by Equation 1.

$$s_l(k), k=-N_{cp}, \ldots, N-1 \text{ and } l=0, \ldots, N_l-1 \quad \text{Equation 1}$$

In Equation 1 $N_{cp}$ is the cyclic prefix length and $s_l(k)$ is defined by Equation 2.

$$s_l(k)=s_l(k+N), k=-N_{cp}, \ldots, -1 \quad \text{Equation 2}$$

Let a multipath channel characterized by a discrete finite length time impulse response be $h_l=[h_l(0), \ldots, h_l(K-1)]$ and with $h_l(i)=0, i<0, i \geq K$. Then the signal propagated through the channel can be described by Equation 3.

$$y_l(k) = \sum_{i=0}^{K-1} h_l(i) s_l(k - i - \tau) + e_l(k), \quad \text{Equation 3}$$

$$k = -N_{cp}, \ldots, N + K + \tau - 2,$$

where $e_1(k)$ is additive complex Gaussian noise with variance $N_0$ and τ is the propagation delay, for simplicity assumed in the number of samples.

One approach to estimate the arrival time τ is to correlate delayed output signals $y_l(k)$ with replicas of the signal $s_l(k)$ in the manner of Equation 4.

$$r(t) = \sum_{l=0}^{N_l-1} \sum_{k=0}^{N-1} y_l(k+t) s_l^*(k), t = 0, \ldots, W-1 \quad \text{Equation 4}$$

In Equation 4, $s_l^*(k)$ is the complex conjugate of the kth sample of signal s in symbol l and W is the search window size counted in the number of time samples. The time-domain filter of Equation 4 is implemented by signal reversal and conjugation unit 115; Fast Fourier Transform (FFT) unit 116; Fast Fourier Transform (FFT) unit 118; element wise multiplication unit 120; Inverse Fast Fourier Transform (IFFT) 121; and coherent accumulation (complex addition) unit 122.

If $s_l(k)$ is a sequence with perfect autocorrelation properties in the manner of Equation 5, where $P_s$ is the power spectral density of the summed signal, and $\delta(u)$ is the so-called Kronecker delta, defined as $\delta(u)=1$ for $u=0$, $\delta(u)=0$ for $u \neq 0$, then the correlation sum as determined by correlator 100 becomes as described in Equation 6.

$$\sum_{k=0}^{N-1} s_l(k+u)s_l*(k) = P_s\delta(u) \quad \text{Equation 5}$$

$$r(t) = \sum_{l=0}^{N_l-1}\sum_{k=0}^{N-1}\left(\sum_{i=0}^{K-1} h_l(i)s_l(k-i-\tau+t)+e_l(k+t)\right)s_l*(k) =$$

$$= P_s\sum_{l=0}^{N_l-1}\sum_{i=0}^{K-1} h_l(i)\delta(t-\tau-i) +$$

$$\sum_{l=0}^{N_l-1}\sum_{k=0}^{N-1} e_l(k+t)s_l*(k) = P_s\sum_{l=0}^{N_l-1} h_l(t-\tau) + v \quad \text{Equation 6}$$

In Equation 6, the term v can be approximated with a complex Gaussian with variance $P_sN_lN_0$. Assuming that $h_l(t-\tau)=h(t-\tau)$, $l=0,\ldots,N_l-1$, the expected value of the squared absolute value correlator output becomes as set forth by Equation 7.

$$E(|r(t)|^2)=(N_lP_s|h(t-\tau)|)^2+P_sN_lN_0 \quad \text{Equation 7}$$

A detector (e.g., reference signal detector 102A) compares a normalized correlator output as described by Equation 8 with a threshold $\lambda$ and if $\rho(t_0) \geq \lambda$ then the signal is declared as present at time $t_0$.

$$\rho(t) = \frac{|r(t)|^2}{P_sN_l\hat{N}_0} \quad \text{Equation 8}$$

In Equation 8, $\hat{N}_0$ denotes an estimate of the noise power $N_0$.

Assuming a high post-correlation signal to noise ratio (see Equation 9), then Equation 10 holds true.

$$(N_lP_s|h(t-\tau)|)^2 \gg P_sN_lN_0 \quad \text{Equation 9}$$

$$\rho(t) \approx \frac{N_lP_s|h(t-\tau)|^2}{\hat{N}_0} \quad \text{Equation 10}$$

In other words, $\rho(t)$ is approximately equal to the SNR including processing gain $P_sN_l$. The estimated arrival time $\tau$ of the first path of the channel is then given by Equation 11 and deduced by PRS time of arrival detector 102B.

$$\tau=\min\{t\}, \text{ subject to the constraint } \rho(t)>\lambda \quad \text{Equation 11}$$

In addition, some measures need to be taken to ensure that the power received at time $\tau$ does not come from a sidelobe from the main peak of the signal. For example, with coherent accumulation and a single peak channel the correlation function will look like a sinc function which has its first sidelobes 13 dB lower than the main peak. So one criterion can be to exclude peaks which are more than a certain decibel level (e.g., Z dB) below the highest peak. Furthermore, some peak interpolation can be performed to refine the time estimate. For example, one can take the correlation results $\rho(\tau-X), \ldots, \rho(\tau+X)$ around the peak and use an interpolation formula to get better resolution of the peak (e.g., a second-order polynomial fit can be applied and then find the peak location of that polynomial. In another extended mode, a center of gravity approach can be used.

The selection of the detection threshold $\lambda$ in Equation 11 is performed by adaptive threshold selector 106. As mentioned earlier, in the prior art it was merely assumed that the received signal consists of the desired signal plus additive Gaussian noise. A deficiency of the prior art assumption is shown by modeling a situation wherein it is assumed that the additional noise term is a mix as described by Equation 26.

$$e(k)=\sqrt{1-\alpha}i(k)+\sqrt{\alpha}v(k) \quad \text{Equation 26}$$

Figure 10:
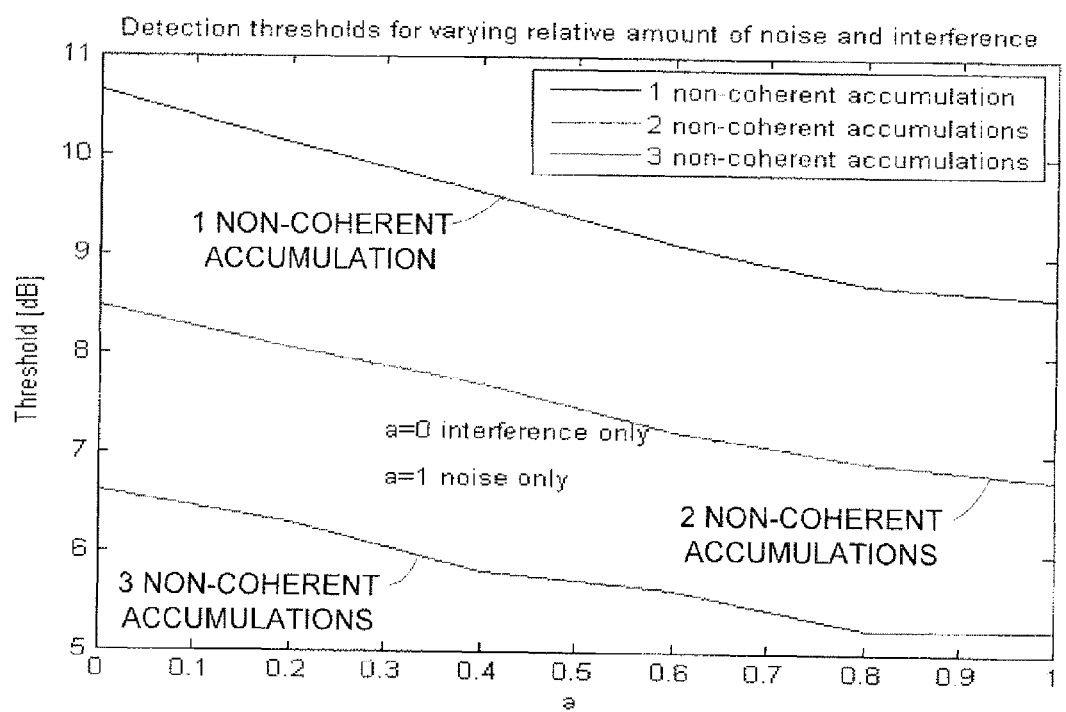
FIG. 10 is a graph showing that a detection thresholds as a function of interference characteristics, and particularly showing that interference threshold can vary by several decibels (dBs) depending on whether non-Gaussian interference or Gaussian noise is dominating.

In Equation 26 $\alpha \in [0,1]$, $i(k)$ is a QPSK modulated signal and $v(k)$ is a complex Gaussian signal. The statistics of the correlator described by Equation 8 when fed with only Equation 26 as input was investigated with simulations. FIG. 10 shows the resulting detection thresholds for a particular desired false alarm rate. The simulated system is the LTE system utilizing six resource blocks (RBs) and up to four positioning subframes. It can from be seen from FIG. 10 that the detection threshold varies with several dBs depending on whether non-Gaussian interference or Gaussian noise is dominating.

Among the contrast to prior art practice, the adaptive threshold selector 106 performs an adaptive selection of the threshold and can take into consideration interference from other base stations (e.g., eNBs). This interference has different characteristics than Gaussian noise and this needs to be accounted for in the selection of detection thresholds. Otherwise the number of false alarms may become too large and the positioning accuracy will then deteriorate. How adaptive threshold selector 106 adaptively determines the threshold is subsequently explained below, the explanation being applicable both to time difference determination units 80 having correlators which operate in the frequency domain and the time domain.

Figure 2:
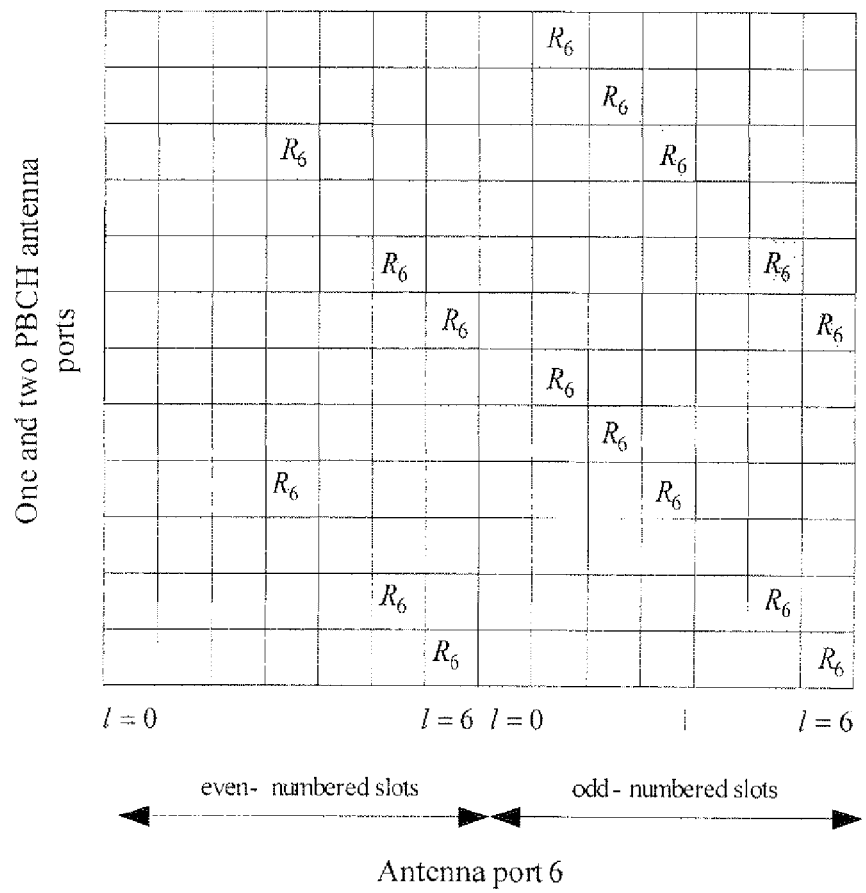
FIG. 2 is a diagrammatic view illustrating a part of the time-frequency plane of an Orthogonal Frequency Division Multiplexing (OFDM) system wherein symbols are modulated onto orthogonal time-frequency units defined by the sub-carriers of an OFDM symbol, and showing reference signals.

In the receiver 24 of FIG. 5, when operating in LTE the reference signal (e.g., positioning reference signal (PRS)) is specified in the frequency domain, in the manner illustrated by FIG. 2. FIG. 2 illustrates only one of four possible PRS configurations. Furthermore, much of the baseband processing is done in the frequency domain, in particular, the received signal y(k) in Equation 3 is available in the frequency domain. Therefore, in another example embodiment of the technology disclosed herein the correlation operation is performed (e.g., by correlator 100FD) in the frequency domain. Operating in the frequency domain can be beneficial since, in addition, the estimation of interference plus noise power can be more conveniently done in the frequency domain. Note that an estimate of the noise plus interference power is needed in Equation 8.

2.2 Correlation in the Frequency Domain

Figure 6B:
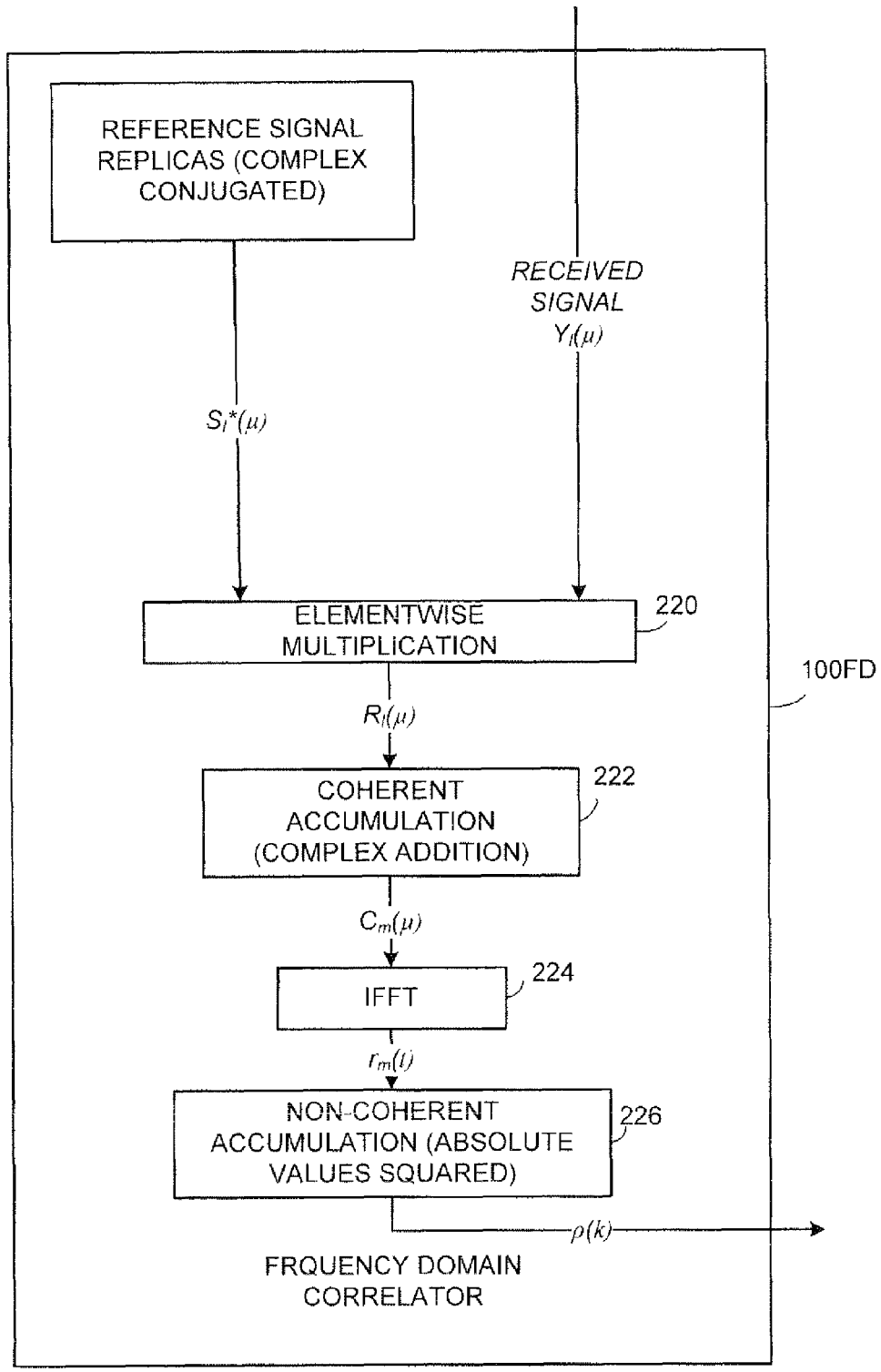
FIG. 6B is a schematic view illustrating an example embodiment of a correlator configured to determine correlation sums in a frequency domain and to use the correlation sums to derive correlator output values.

Therefore, although the adaptive threshold selector 106 can be utilized with a correlator such as correlator 100TD of FIG. 6A which operates in the time domain, in some embodiments such as that shown in FIG. 6B it is preferable for the correlator to operate in the frequency domain.

In an example embodiment the frequency correlator 100FD of FIG. 6B comprises element wise multiplication unit 220; coherent accumulation (complex addition) unit 222; Inverse Fast Fourier Transform (IFFT) unit 224; and non-coherent accumulation unit 226. The element wise multiplication unit 220 receives the frequency domain output signal $Y_l(\mu)$ from receiver 98 and a frequency domain reference signal replica (complex conjugated) $S_l^*(\mu)$ and produces a frequency domain product $R_l(\mu)$. In an example embodiment the frequency domain product $R_l(\mu)$ of element wise multiplication unit 220 implements Equation 17. The frequency domain product $R_l(\mu)$ of element wise multiplication unit 220 is applied to coherent accumulation (complex addition) unit 222, which yields a summed frequency domain product $C_m(\mu)$ [also known as a "frequency domain correlation sum"]. The operation of accumulation unit 222 essentially implements Equation 18. The summed frequency domain product $C_m(\mu)$ is converted to the time domain summed product signal $r_m(t)$ by Inverse Fast Fourier Transform (IFFT) unit 224 in the manner of Equation 19. The time domain summed product signal $r_m(t)$ is applied to non-coherent accumulation unit 226, which provides the correlator output $\rho(k)$ in the manner of Equation 20.

With regard to frequency domain operation, it is well known that circular convolution of two sequences is equal to multiplication of the FFTs of the signals in the frequency domain. In circular convolution, the linear convolution (1) is replaced the expression of Equation 12.

$$y_l(k) = \sum_{i=0}^{K-1} h_l(i) s_l(k-i-\tau)_N + e_l(k), \qquad \text{Equation 12}$$

In Equation 12, $s_l(\ )_N$ means that the index is taken modulo N. Now due to the use of cyclic prefix of length $N_{cp}$, $s(-k)=s(N-k)$, for $k=1, \ldots, N_{cp}$. So as long as $K+\tau \leq N_{cp}$, the circular convolution (12) is equal to the linear convolution (3).

The Fast Fourier Transform (FFT) $X(\mu)$ of a sequence $x(k)$ is defined by $$X(\mu) = FFT(x(k)) = \frac{1}{N} \sum_{k=0}^{N-1} x(k) e^{-i2\pi k \mu/N}, \qquad \text{Equation 13}$$

$$\mu = 0, \ldots, N-1.$$

With the notation above we can define the FFT of $y_l(k)$ in Equation 12 as Equation 14.

$$Y_l(\mu) = H_l(\mu) FFT(s_l(k-\tau)) + E_l(\mu). \qquad \text{Equation 14}$$

Another property of FFT is that $FFT(x(k-\tau)) = e^{-i2\pi \tau \mu/N} X(\mu)$ as long as $$x(k-\tau) = x(k-\tau)_N, k=0, \ldots, N-1, \qquad \text{Equation 15}$$

which is the case for $s_l(k)$ due to the use of cyclic prefix (2). Hence $$Y_l(\mu) = H_l(\mu) S_l(\mu) e^{-i2\pi \tau \mu/N} + E_l(\mu). \qquad \text{Equation 16}$$

Now we multiply Equation (16) with the known PRS symbol $S_1(\mu)$, with property $|S_1(\mu)|=1$ if the lth OFDM symbol has a PRS symbol in subcarrier $\mu$, $S_l(\mu)=0$ otherwise, so that $$R_l(\mu) = Y_l(\mu) S_l^*(\mu) = H_l(\mu) e^{-i2\pi \tau \mu/N} + S_l^*(\mu) E_l(\mu). \qquad \text{Equation 17}$$

if the lth OFDM symbol has a PRS symbol in subcarrier $\mu$, and $R_l(\mu)=0$ otherwise.

The reference signals typically span several OFDM symbols, so the processing described above is repeated for all OFDM symbols containing PRS. M segments each consisting of an integer number $N_c$ of OFDM symbols are coherently added in the manner of Equation 18.

$$C_m(\mu) = \frac{1}{N_\mu} \sum_{l=0}^{N_c-1} R_{(m-1) \cdot L + l}(\mu) = \qquad \text{Equation 18}$$

$$= \frac{1}{N_\mu} \sum_{l=1}^{N_c-1} (H_l(\mu) e^{-i2\pi \tau/N} + S_l^*(\mu) E_l(\mu)),$$

$$m = 0, \ldots, M-1.$$

In Equation 18, $N_\mu$ is the number of coherently accumulated PRS symbols in subcarrier $\mu$. For those OFDM symbols/subcarriers that do not contain PRS, the corresponding $R(\mu)$, is set to zero. For subcarriers that do not contain PRS in any OFDM symbol, $C_m(\mu)$ is set to zero. The time domain equivalent of $C_m(\mu)$ is obtained by applying Inverse Fast Fourier Transform (IFFT) as shown by Equation 19. Equation 19 also essentially expresses operation of coherent accumulation unit 122 of FIG. 6A.

$$r_m(t) = IFFT(C_m(\mu)) = \sum_{\mu=0}^{N-1} C_m(\mu) e^{i2\pi t \mu/N}, \qquad \text{Equation 19}$$

$$t = 0, \ldots, N-1$$

The choice of coherent accumulation length $N_c$ depends on the speed of the wireless device. If $N_c$ is chosen too large, the channel phase may rotate during the measurement. In such a case the terms in the complex sum in Equation 19 starts to partly cancel each other. Therefore it may be necessary to stop the coherent summation after $N_c$ number of OFDM symbols have been added, perform an Inverse Fast Fourier Transform (IFFT) according to Equation 19, and take the square of the result to estimate the accumulated energy. Finally M such non-coherent accumulations are added. The resulting correlator output can then be written in accordance with Equation 20. From Equation 20 the person skilled in the art also understands operation of the non-coherent accumulation unit 126 of correlator 100TD of FIG. 6A.

$$\rho(t) = \sum_{m=0}^{M-1} |r_m(t)|^2. \qquad \text{Equation 20}$$

The values of $\rho(t)$ are compared to a threshold and if any $\rho(t)$ is larger than the threshold then a finer search is done to interpolate the position of the first peak, e.g. as previously discussed. The existing and the proposed approaches for deriving the threshold are discussed below.

3.0 Adaptive Threshold Selection 3.1 Adaptive Threshold Selection: Gaussian Noise Since there is no guarantee that the signal has enough power to be detected, the threshold should be selected so as to avoid false alarms. Assuming only Gaussian noise as input in Equation 19, then the terms $$r_m(t) = IFFT\left(\frac{1}{N_\mu} \sum_{l=0}^{N_c-1} R_{(m-1) \cdot N_c + l}(\mu)\right) \qquad \text{Equation 21}$$

$$= IFFT\left(\frac{1}{N_\mu} \sum_{l=0}^{N_c-1} S_{(m-1) \cdot N_c + l}^*(\mu) E_{(m-1) \cdot N_c + l}(\mu)\right)$$

are distributed as $$r_m(t) = x_{re} + x_{im} \quad \text{Equation 22}$$

where $x_{re}$ and $x_{im}$ are $N(0, \Sigma_{\mu=0}^{N-1} N_0/2N_\mu)$ distributed variables representing the real and imaginary parts of the correlation term $r_m(t)$, respectively. Hence $\rho(t)$ in Equation 20 is the sum of squares of Gaussian variables. This means that $2\rho(t)/(\Sigma_{\mu=0}^{N-1} N_0/2N_\mu)$ is $\chi^2(2M)$ distributed.

In order to proceed, an estimate of the noise variance $N_0$ is needed. By taking the square of all received samples in the frequencies we obtain the estimate $$N_{sum} = \frac{1}{L} \sum_{l=0}^{Nl-1} \sum_{\mu_l=0}^{Lsym(l)-1} |Y_l(\mu_l)|^2 \approx MN_0, \quad \text{Equation 23}$$

where $\mu_l$ are the frequency indices where there is a PRS symbol in the lth OFDM symbol and where $L_{sym}(l)$ is the number of PRS symbols in the lth OFDM symbol. Here L is the total number of coherently accumulated reference signal resource elements. If we take as detection variable $$\lambda(t) = \rho(t)/(\Sigma_{\mu=0}^{N-1} 1/2N_\mu) N_{sum} \quad \text{Equation 24}$$

Then, if for any time delay t, $\lambda(t) > \lambda^*$ where $\lambda A$ is the detection threshold, then it is declared that the signal is present at delay t. $\lambda(t)$ in (24) is approximately distributed as $$\frac{\rho(t)}{M \sum_{\mu=0}^{N-1} (1/2N_\mu) N_0} = \frac{1}{2M} v, \quad \text{Equation 25}$$

where $v \sim \chi^2(2M)$. We can then determine the level of the cumulative distribution of $\chi^2(2M)$ where the probability is $1-P_{fa}$ with $P_{fa}$ as the desired false alarm. Note that the noise power $N_0$ vanished when normalized by the detector variable using Equation 24. The desired threshold is then $$\lambda_{noise}^* = \frac{1}{2M} chi2inv(1 - P_{fa}, 2M) \quad \text{Equation 27}$$

where chi2inv is the inverse of the cumulative distribution function for $\chi^2(2M)$ at the $1-P_{fa}$ level.

Thus, Equation 27 shows that, in an example embodiment the pure noise threshold is dependent upon the inverse of the cumulative distribution function $\chi^2(2M)$ at a $1-P_{fa}$ level, where M is an integer number of OFDM segments of the reference signal, and where $P_{fa}$ is a false alarm value. The suffix "noise" highlights that, in this example embodiment, this threshold is applicable when the additional noise consists of complex Gaussian white noise only.

Figure 7:
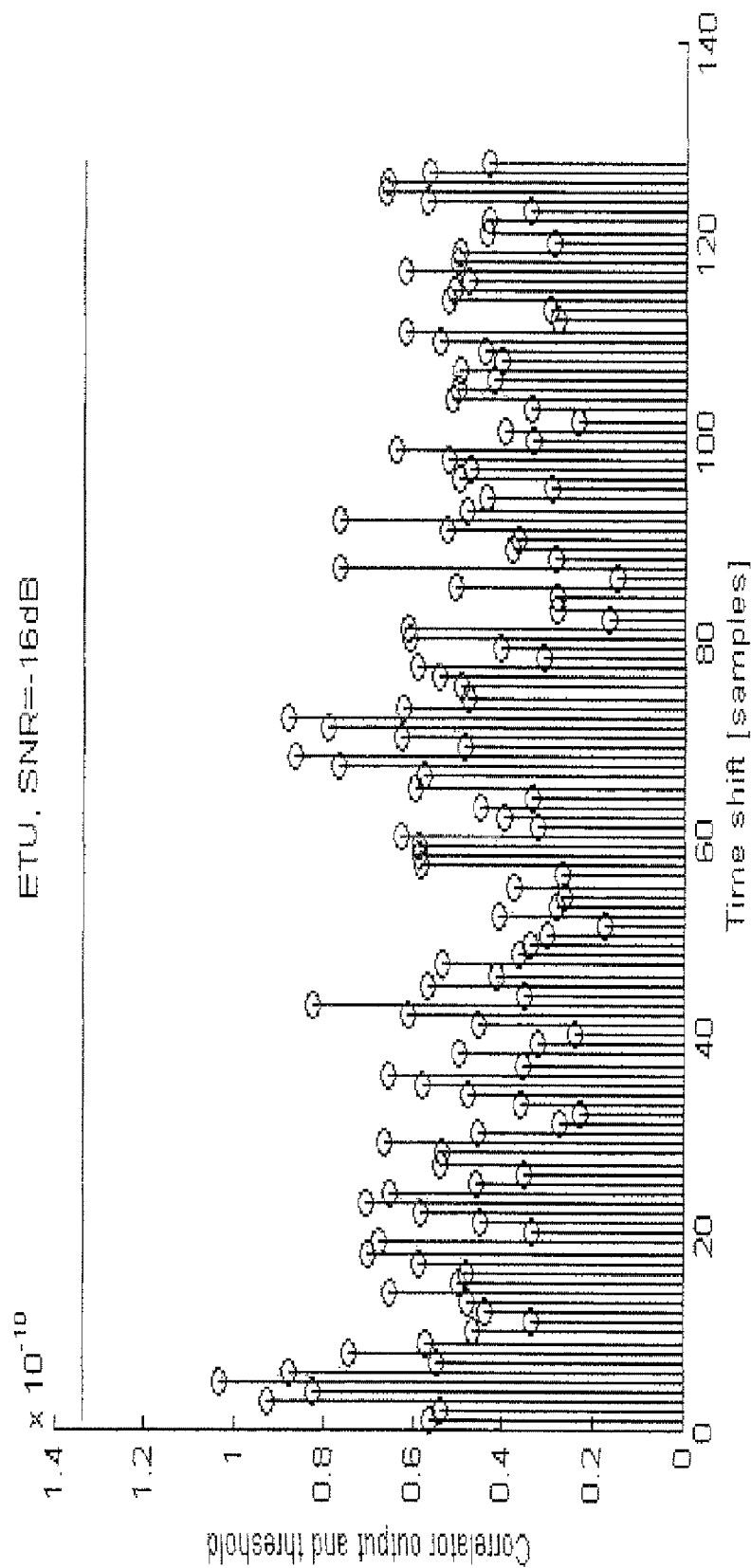
FIG. 7-FIG. 9 are graphs reflecting correlator output and fixed detection threshold for different channel models, FIG. 7 and FIG. 8 showing a highly dispersive ETU channel model and FIG. 9 showing an EPA channel model which contains only a few paths.
Figure 8:
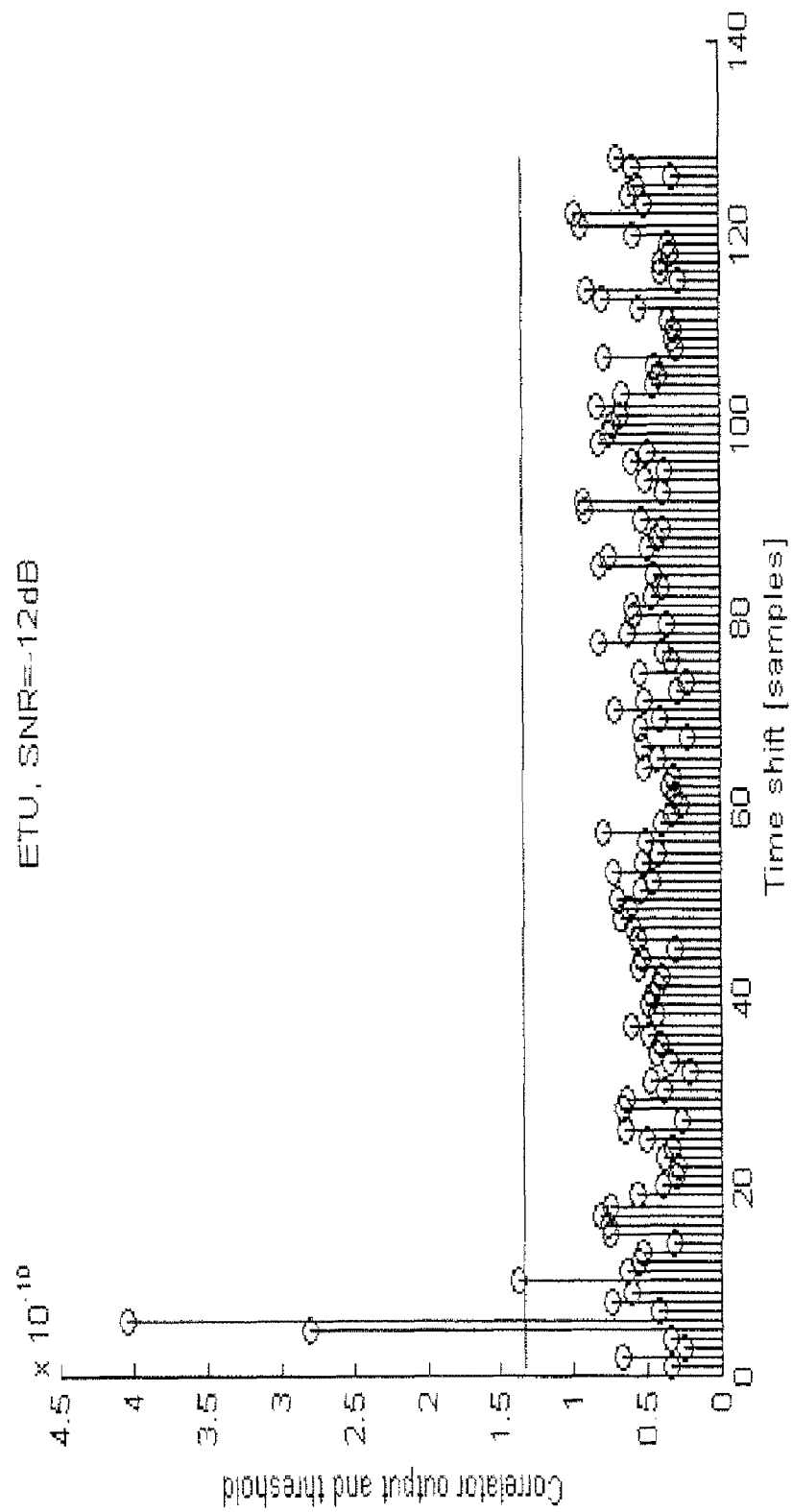
Figure 9:
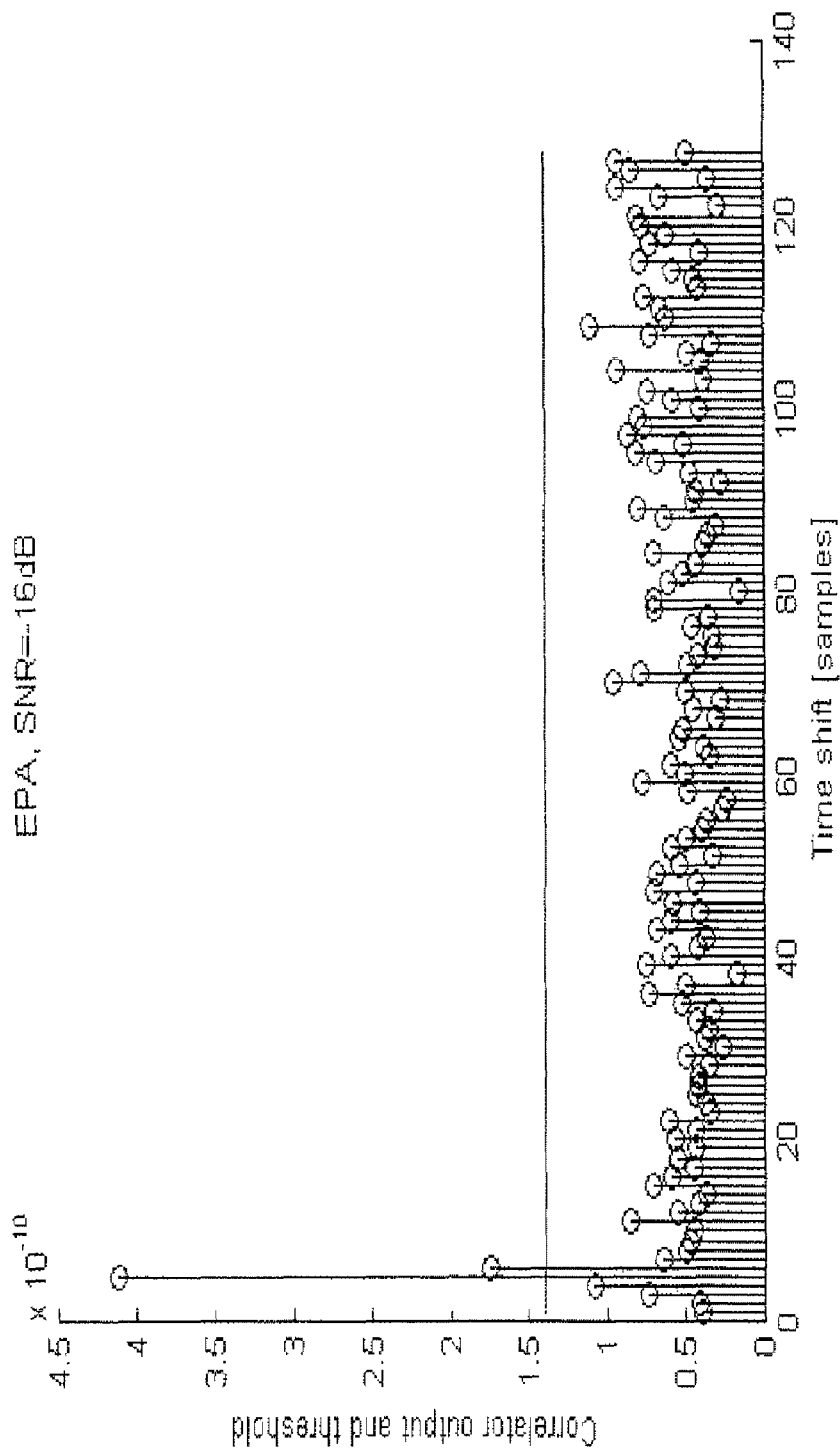

Examples of this outlined timing estimation procedure are shown in FIG. 7-9 for two different channel models: ETU (which is highly dispersive) and EPA (which contains only a few paths). The signal is an LTE signal utilizing 6 resource blocks, i.e. the Fast Fourier Transform (FFT) size is 128. In FIG. 7-9, the plots show $\rho(t)$ (see Equation 20) for 128 different shifts and the thresholds derived by Equation 25 are shown as straight lines.

3.2 Adaptive Threshold Selection: Interference

The threshold given by Equation 27 holds when the noise is purely Gaussian thermal noise. In reality noise may also be encountered from a strong co-located interferer, for example, where the interfering signal is another QPSK modulated signal.

A model of such an interferer is given by Equation 28.

$$Y_I(\mu) = \sqrt{N_0} I_I(\mu) \quad \text{Equation 28}$$

where $N_0$ is power of the interfering (assumed flat) channel and $I_I(\mu)$ is the QPSK modulated interfering signal.

After correlation we obtain the expression of Equation 29.

$$R_I(\mu) = Y_I(\mu) S_I^*(\mu) = \sqrt{N_0} I_I(\mu) S_I^*(\mu) = \sqrt{N_0} V_I(\mu) \quad \text{Equation 29}$$

The Equation 29 term $V_I(\mu)$ is a product of two QPSK symbols. QPSK symbols in LTE are taken from the symbol alphabet $(1/\sqrt{2}, -1/\sqrt{2}, i/\sqrt{2}, -i/\sqrt{2})$. Therefore the product of two QPSK symbols takes values in the set $(+1, -1, +i, -i)$. Following the procedure and notation of Section 3.1, the statistics of the detector output as given by Equation (24) will be derived assuming only the interferer of Equation (28) as input. To simplify the discussion, the statistics is evaluated only for $\lambda(0)$, i.e., zero delay. For this case, the IFFT operation consists of pure summation. To further simplify (but without losing generality) the received QPSK symbols are rotated 45 degrees so that the constellation becomes $(1/\sqrt{2}, -1/\sqrt{2}, i/\sqrt{2}, -i/\sqrt{2})$. First, the coherent accumulation sum in the subcarrier domain becomes $$C_m(\mu) = \frac{1}{N_\mu} \sum_{l=0}^{Nc-1} R_{(m-1)*L+l}(\mu)$$

$$= \frac{\sqrt{N_0}}{N_\mu} \sum_{l=0}^{Nc-1} V_{(m-1)*L+l}(\mu) \quad \text{Equation 30}$$

With reference to FIG. 2, it can be seen that the number of PRS symbols per subcarrier per subframe can be either 0, 1 or 2. Therefore $N_\mu = 0$, $N_c/14$ or $N_c/7$. Let $N_1$ denote the total number of PRS symbols from subcarriers containing one PRS symbol per subframe, and $N_2$ denote the total number of PRS symbols from subcarriers containing two PRS symbol per subframe. Summation of (30) over all subcarriers yields the Inverse Fast Fourier Transform (IFFT) evaluated at $t=0$. The real part of this sum is denoted $$r_{m,re}(0) = \frac{14\sqrt{N_0}}{N_c} \sum_{l=0}^{N_1-1} X_1(l) + \frac{7\sqrt{N_0}}{N_c} \sum_{l=0}^{N_2-1} X_2(l) \quad \text{Equation 31}$$

where $X_1$, $X_2$ are taken from alphabet $(1/\sqrt{2}, -1/\sqrt{2})$. Hence $K_i = \Sigma_{l=0}^{N_i-1} \sqrt{2} X_i(l)/2 + N_i/2$, $i=1, 2$, are binomially distributed, i.e., $$Pr(K_i = k_i) = \binom{N_i}{k_i} \cdot 0.5^{N_i} = \frac{N_i!}{k_i!(N_i - k_i)!} \cdot 0.5^{N_i}, \quad \text{Equation 32}$$

$$i = 1, 2$$

Since $\Sigma_{l=0}^{N_i-1} X_i(l) = \sqrt{2}K_i - N_i/\sqrt{2}$, Equation 31 can now be rewritten as $$r_{m,re}(0) = \frac{7\sqrt{2N_0}}{N_c}(2K_1 + K_2) - \frac{7\sqrt{2N_0}}{2N_c}(2N_1 + N_2)$$

Let $K=2K_1+K_2$ and define $y=\sqrt{N_0}((7\sqrt{2}/N_c)k-(7\sqrt{2}/2N_1+N_2))$. Then $$Pr(r_{m,re}(0) = y) = Pr(K = k) \qquad \text{Equation 33}$$
$$= \sum_{2k_1+k_2=k} P(K_1 = k_1)P(K_2 = k_2)$$

for $k=0, \ldots, 2N_1N_2$, and where the summation is performed for $k_1=0, \ldots, N_1$, $k_2=0, \ldots, N_2$. The probability $Pr(r_{m,re}^2(0)=y^2)$ can now be readily defined to be $$Pr(r_{m,re}^2(0) = y^2) = \qquad \text{Equation 34}$$
$$\begin{cases} Pr\left(K = k - \frac{2N_1+N_2}{2}\right) + Pr\left(K = k + \frac{2N_1+N_2}{2}\right), \\ k \neq \frac{2N_1+N_2}{2} \\ Pr\left(K = \frac{2N_1+N_2}{2}\right), \\ k = \frac{2N_1+N_2}{2} \end{cases}$$

The probability $Pr(r_{m,re}^2(0)=y^2)$ in Equation 34 can thus be explicitly computed for $$y^2 = N_0((7\sqrt{2}/N_c)k - (7\sqrt{2}/2N_c)(2N_1+N_2))^2,$$
$$k=0, \ldots, 2N_1+N_2.$$

It is easy to realize that $r_{n,im}^2(0)$ has the same probability distribution function as $r_{m,re}^2(0)$. Next note that since $r_{m,re}(0)$ and $r_{m,im}(0)$ are independent and of zero mean, the detector variable (24) can be rewritten as a sum $$\lambda(0) = \rho(0) / \left(MN_0 \sum_{\mu=0}^{N-1}(1/2N_\mu)\right) \qquad \text{Equation 35}$$
$$= \sum_{m=0}^{M-1} |(r_m(0))|^2 / \left(MN_0 \sum_{\mu=0}^{N-1}(1/2N_\mu)\right) =$$
$$= \sum_{m=0}^{M-1}(r_{m,re}^2(0) + r_{m,im}^2(0)) / \left(N_0 M \sum_{\mu=0}^{N-1}(1/2N_\mu)\right)$$

where the statistics of each term $r_{m,re}^2(0)$, $r_{m,im}^2(0)$ can be determined using Equation 32-Equation 34.

The probability density function of the sum of two random variables can be obtained by convolving the density functions. Convolution is then repeated until the distribution of 2M summations is obtained. The corresponding cumulative density function is denoted as $F_{QPSK}(x;M,N_c,N_1,N_2)$, where the dependence on the parameters M, $N_c$, $N_1$ and $N_2$ has been explicitly stated. The threshold value corresponding to the $1-P_{fa}$ value can now be determined as $$\lambda_{QPSK}^* = F_{QPSK}^{-1}(1-P_{fa};M,N_c,N_1,N_2) \qquad \text{Equation 36}$$

Equation 36 thus shows that, in an example embodiment, the pure interference threshold is dependent upon the expression $\lambda_{QPSK}^* F_{QPSK}^{-1}(1-P_{fa};M,N_c,N_1,N_2)$, where M is an integer number of OFDM segments of the reference signal, each segment consisting of $N_c$ number of OFDM symbols, wherein $N_c$ is an integer accumulation length of the reference signal, wherein $N_1$ is the total number of PRS symbols from subcarriers containing one PRS symbol per subframe, wherein $N_2$ denote the total number of PRS symbols from subcarriers containing two PRS symbol per subframe. wherein $F_{QPSK}(1-P_{fa};M,N_c,N_1,N_2)$ is a cumulative density function dependent upon $(1-P_{fa})$, and wherein $P_{fa}$ is a false alarm value. The suffix "QPSK" that is used to highlight that this threshold is applicable when the additional noise consists of a QPSK modulated interferer only.

3.3 Adaptive Threshold Selection: α Estimation

To finally decide a threshold, a noise weight factor α used in Equation 26 should be estimated. To calculate an estimate of α, the fourth moment of e(k) is examined. As used herein, e(k) is the same as the "received signal" in the time or frequency domain, e.g., the received channel-propagated signal received from the radio channel. For a Gaussian variable $E|e(k)|^4=2N_0^2$, whereas for QPSK symbols $E|e(k)|^4=N_0^2$. As detection variable the adaptive threshold selector 106 calculates an estimate of the normalized fourth moment of e(k) as follows:

$$z = \frac{\sum_{l,\mu}|Y_l(\mu_l)|^4}{\left(\sum_{l,\mu}|Y_l(\mu_l)|^2\right)^2} \approx \frac{E|e(k)|^4}{(E|e(k)|^2)^2}. \qquad \text{Equation 37}$$

In Equation 37, the summation is over all frequency indices $\mu_l$ where there is a PRS symbol in the lth OFDM symbol (compare with Equation 23). The relation between z and α can be shown to be $$z=1+2\alpha-\alpha^2, \qquad \text{Equation 38}$$

so that an estimate of α is the first root to the quadratic Equation 38, i.e. which lies in the interval [0,1], $$\hat{\alpha}=1-\sqrt{2-z} \qquad \text{Equation 39}$$

Using the estimate of z, the estimated noise weight factor α is obtained. Using the estimated α, the adaptive threshold selector 106 can select the adaptive threshold, e.g. by linear interpolation between the pure noise threshold $\lambda^*_{noise}$-(Equation 27) and the pure interference threshold $\lambda^*_{QPSK}$ (Equation 36). In general, the pure noise threshold is defined based on the assumption that all the received interference and noise consist of random signals (following the Gaussian distribution in the described example), whilst the pure interference threshold is defined based on the assumption that the all the received interference noise and interference comprise of signals of a known modulation (QPSK in the described example). The adaptive threshold selector 106 obtains the adaptive threshold in accordance with Equation 39a.

$$\lambda_{adaptive}^* = \hat{\alpha}\lambda_{noise}^* + (1-\hat{\alpha})\lambda_{QPSK}^* \qquad \text{Equation 39a}$$

The interpolation can also be made in the logarithmic domain, e.g., by converting the linear threshold power values into decibel values.

The thresholds $\lambda_{noise}^*$ and $\lambda_{QPSK}^*$ can be computed by the adaptive threshold selector 106 at the same time as the positioning measurements are being performed. Alternatively, all thresholds can be computed offline and stored in memory for possible values of M. $N_c$, $N_1$, $N_2$ and $P_{fa}$. As a further option, appropriate threshold values for varying values of α, M, $N_c$, $N_1$, $N_2$ and $P_{fa}$ can be precomputed, e.g., by means of simulations as illustrated in FIG. 10, and stored in memory and made available to the adaptive threshold selector 106.

Alternatively, an explicit formula for the fractional noise/interference case can be derived, e.g., by scaling and convolving a quantized Gaussian distribution with the distribution defined by Equation 33.

Figure 11:
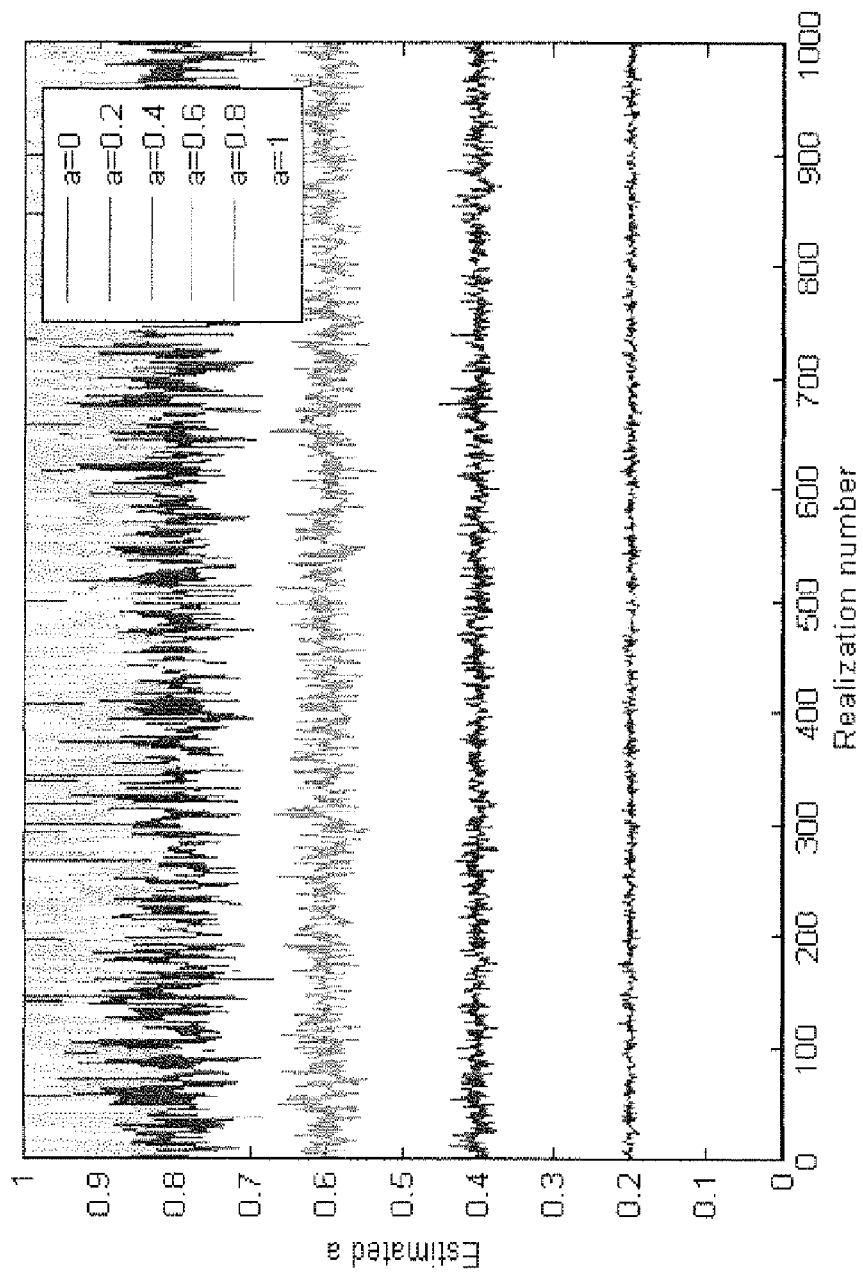
FIG. 11 is a graph showing output of an estimator of noise weight factor α in multiple snapshots, and particularly showing that a can be accurately estimated in most cases.

The performance of the estimator of the noise weight factor α is shown in FIG. 11, which shows that α can be accurately estimated in most cases.

3.4 Adaptive Threshold Selection: Choice of False Alarm Rate

One final aspect is the choice of false alarm rate $P_{fa}$. Note that $P_{fa}$ is an input variable to the threshold calculations according to Equation 25 and as described above. The value of $P_{fa}$ depends, e.g., on the number of eNBs the UE is ordered to measure and the amount of initial uncertainty in the expected timing.

Assume that the target is that the probability that at least one measurement out of $n_{cells}$ is corrupt is $P_{fpos}$. This is given by $$P_{fpos} = 1 - (1 - P_{fNB})^{ncells} \sim n_{cells} P_{fNB}.$$

Equation 40

Assuming that the UE has to search W delays, the per delay probability $P_{fa}$ can now be determined as $$P_{fa} \sim P_{fpos}/(n_{cells}W).$$

Equation 41

Figure 12:
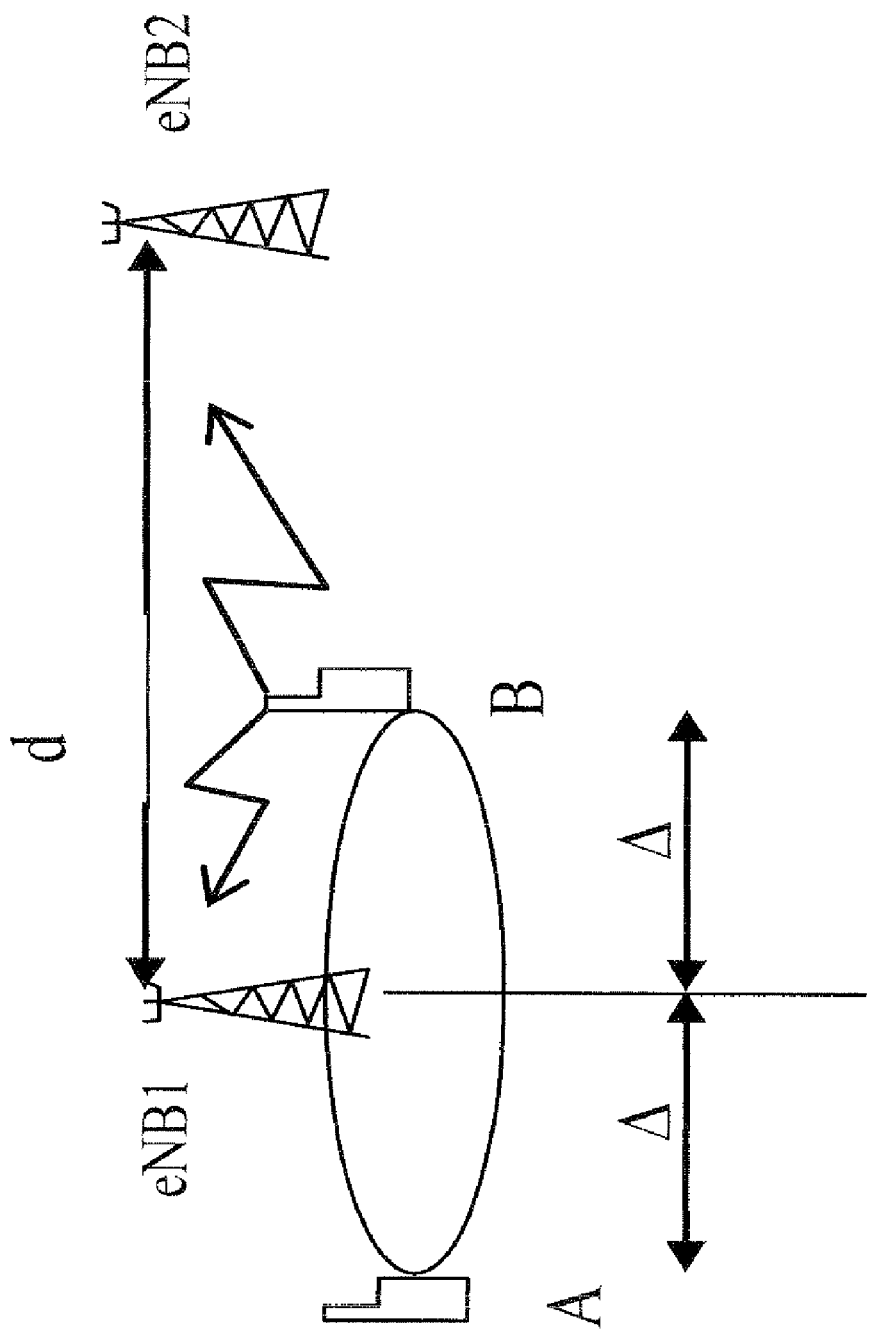
FIG. 12 is a diagrammatic view depicting geometry for a delay uncertainty calculation.

The uncertainty in the signal arrival time at the UE location can be analyzed by considering the geometry in FIG. 12. UE is apriori located in a cell with distance Δ from the eNB1. This information is known, e.g. through the use of Timing Advance to synchronize the UE transmissions. Note that it is not known whether the UE is at position A or position B in FIG. 12. Assume that signals are transmitted from eNB1 and eNB2 at time to.

Given speed of light c, the signals from eNB1 and eNB2 arrive through a line-of-sight path at position A at times $t_1$ and $t_2$, respectively:

$$t_1 = t_0 + \frac{\Delta}{c},$$

Equation 42

$$t_2 = t_0 + \frac{d + \Delta}{c}.$$

Equation 43

If UE is at B, then the signals arrive at times:

$$t_1 = t_0 + \frac{\Delta}{c},$$

Equation 44

$$t_2 = t_0 + \frac{d - \Delta}{c}.$$

Equation 45

Assume eNB1 is the serving cell to which the distance is known due to Timing Advance mechanism. Given $t_1$, it is possible to predict the signal arrival time from eNB2 in order to minimize the code phase search. Note that for $$\text{position } A: t_2 = t_1 - \frac{\Delta}{c} + \frac{d + \Delta}{c} = t_1 + \frac{d}{c},$$

Equation 46

$$\text{position } B: t_2 = t_1 - \frac{\Delta}{c} + \frac{d - \Delta}{c} = t_1 + \frac{d - 2\Delta}{c}.$$

Equation 47

As a result, $$t_2 \in \left[ t_1 + \frac{d}{c} - \frac{2\Delta}{c}, t_1 + \frac{d}{c} \right].$$

Equation 48

The width of the time of arrival uncertainty window is thus $$t_{un} = \frac{2\Delta}{c}.$$

Equation 49

The UE thus has to search over $$W = \frac{2\Delta}{c} \cdot \frac{1}{T_s}$$

Equation 50 different shifts, where Ts is the sampling interval.

4.0 Modeling and Simulations

The proposed scheme for time of arrival estimation using LTE Positioning Reference Signals (PRS) was evaluated by means of system simulations. The system simulation assumptions were as listed in 3GPP TSG-RAN WG4 Meeting #52bis, R4-094089, Miyazaki, Japan, Oct. 12-Oct. 16, 2009, which is incorporated herein by reference. Three detection threshold schemes were tested, the scheme based on Gaussian noise ('noise') as described in Section 3.1; the QPSK interference based method from Section 3.2 ('qpsk'); and the adaptive scheme outlined in Section 3.3 ('adaptive').

Figure 13:
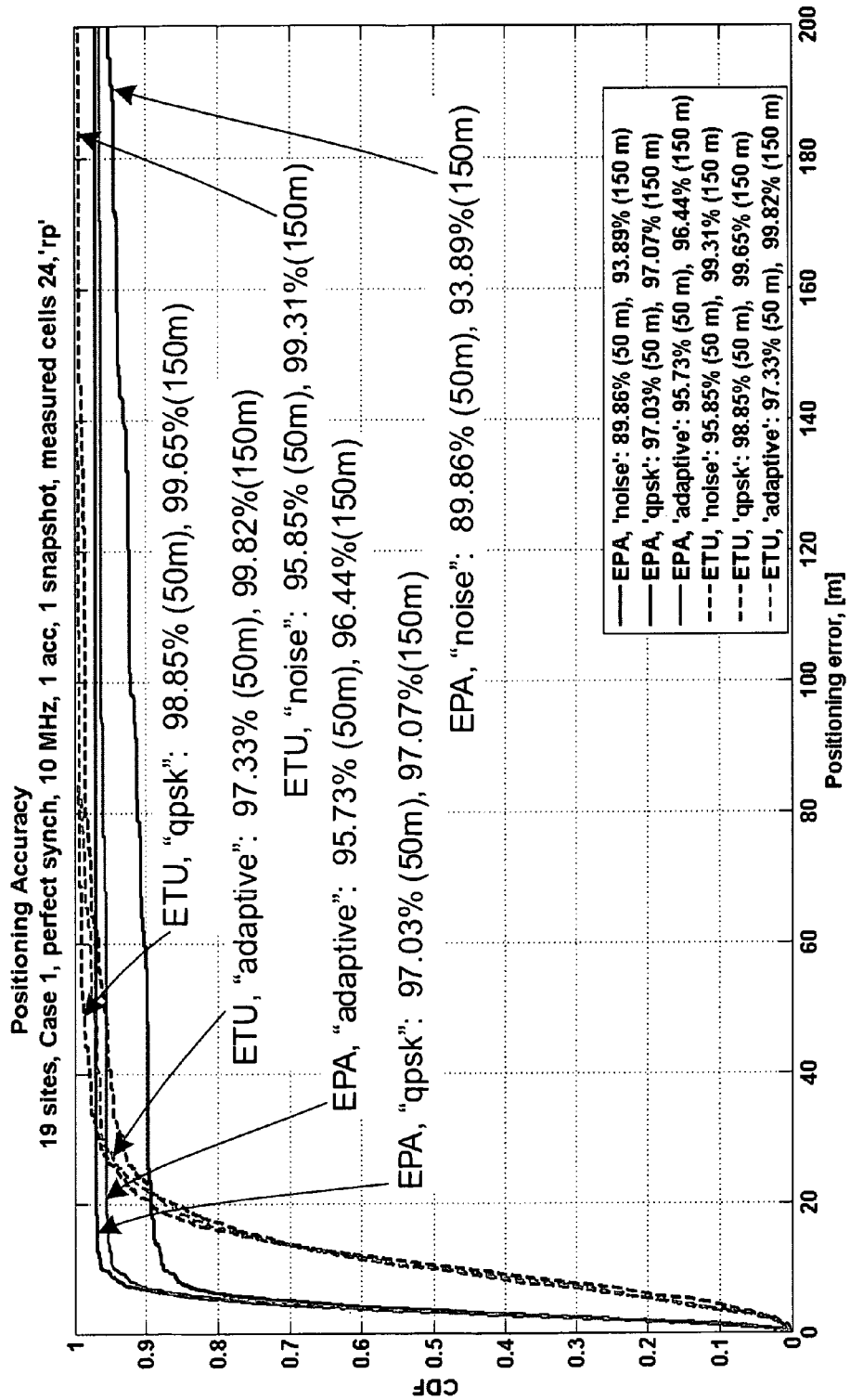
FIG. 13 is a graph illustrating positioning accuracy results for a synchronized system with an inter-site distance of 500 m.

FIG. 13 illustrates results for a Case 1. Case 1 is characterized by an inter-site distance of 500 m. The network is synchronized. For Case 1, the QPSK-based threshold is the best with the adaptive one being very close in performance. The noise-based scheme is slightly worse for ETU and significantly worse for EPA. This seems to suggest that there is a relatively high probability to have one strong interferer in this synchronized scenario.

Figure 14:
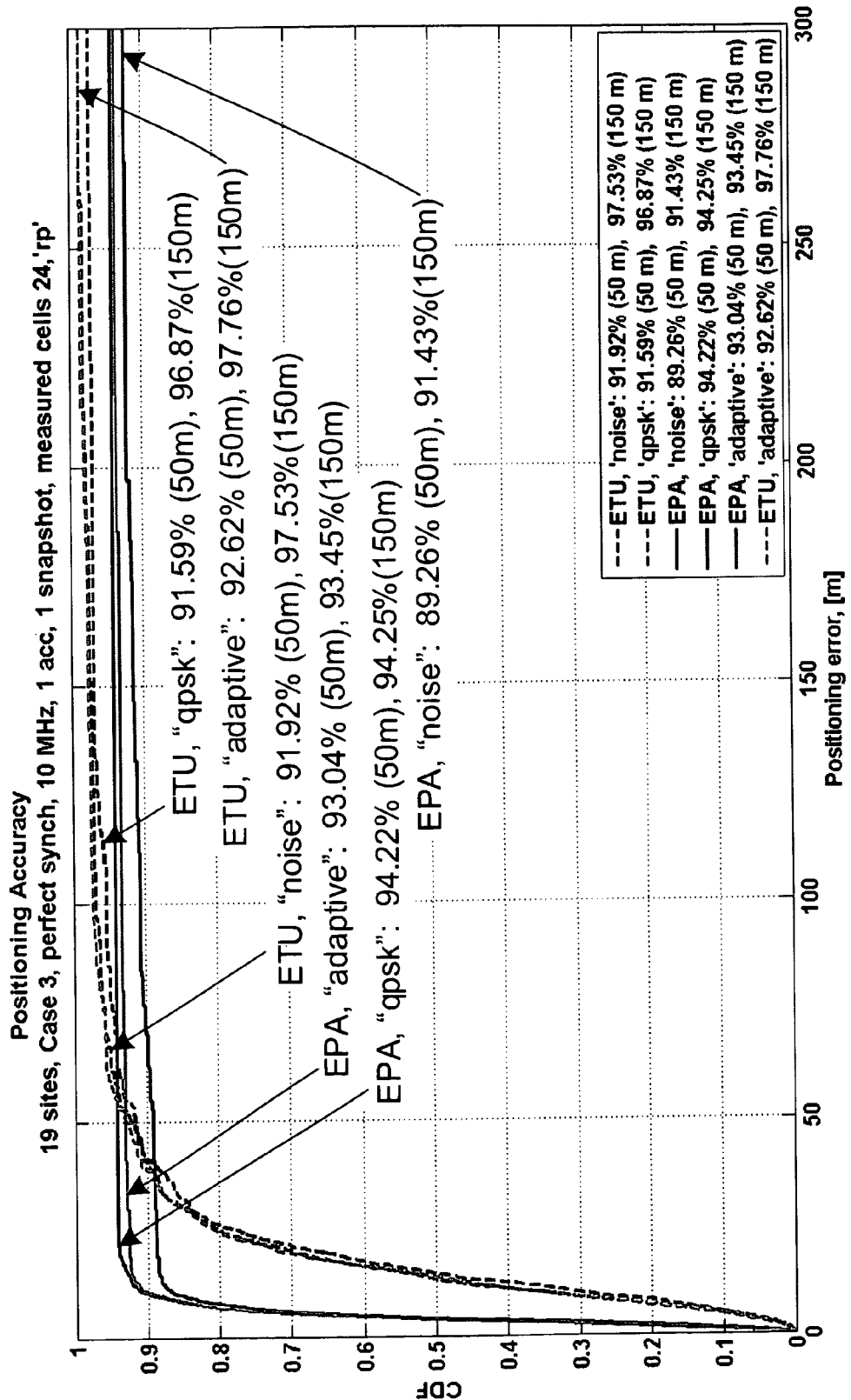
FIG. 14 is a graph illustrating positioning accuracy results for a synchronized system with an inter-site distance of 1732 m.

FIG. 14 illustrates results for a Case 3. Case 3, which is characterized by an inter-site distance of 1732 m. Also in Case 3, the QPSK-based and the adaptive ones are the best and the noise-based method slightly worse. Also in this case it is likely that one strong interferer appears relatively often.

Figure 15:
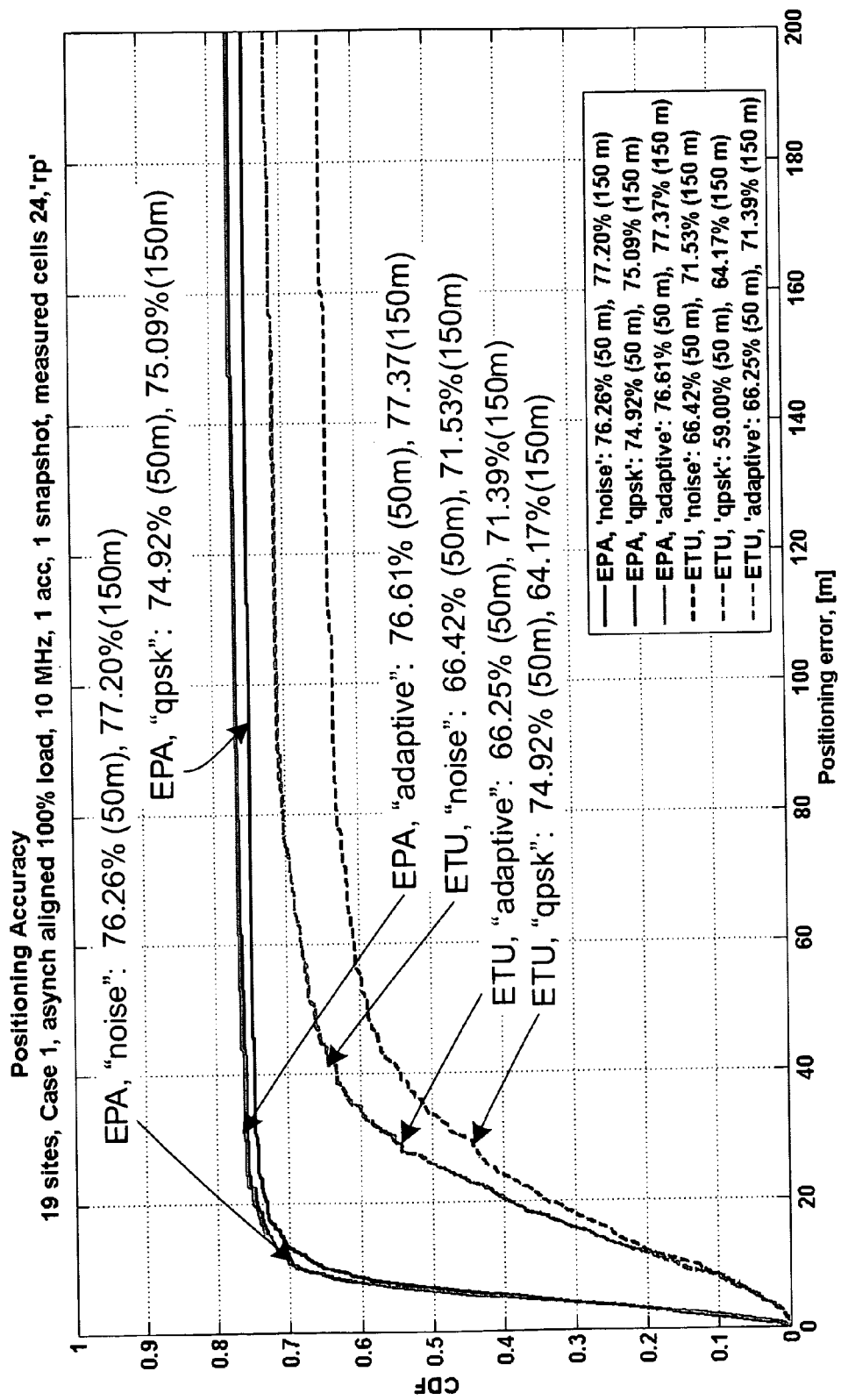
FIG. 15 is a graph illustrating positioning accuracy results for an asynchronous system with partially aligned positioning subframes and an inter-site distance of 500 m.

FIG. 15 illustrates results for the Case 1, but where the network is not synchronized and where the positioning frames are only partially aligned. In this case, it turns out that the QPSK-based method is the worst, whereas the noise-based and the adaptive scheme perform equally well. In this case, the interference comes from multiple base stations and therefore the sum of interference terms appear more like noise.

To summarize, the presented results confirm that the adaptive scheme offers the best compromise when the interference situation is varying.

The technology disclosed herein does not exclude and is intended to encompass the case that positioning measurements can be conducted on reference signals other than (PRS), since the technology disclosed herein is also applicable, for example, for the case when Common Reference Signals (CRS) are measured.

5.0 Example Advantages

The technology disclosed herein concerns method and apparatus to derive adaptive detection thresholds based on analysis of the interferer/noise characteristics. The technology disclosed herein provides both reduction of false alarms and increased detection probability compared to the case where fixed (state-of-the-art) thresholds are used. False alarms due to strong interferers are reduced by increasing the detection thresholds when it is detected that one strong interferer is dominating. When the signal is corrupted by noise only, the thresholds are lowered, hereby enabling detection of weak signals.

Except that optimizing uniform thresholds for a real network is a tedious task, the technology disclosed herein is particularly important for non-uniform and heterogeneous environments where reference signals from many cells can be detectable by the wireless device in at least some parts of the network and the detection threshold cannot be configured to be uniform for the entire network due to non-uniform cell sizes, various propagation conditions, etc. This can be significant for reference signals used for positioning a wireless device such as a wireless terminal where timing measurements need to be taken for more than three base stations and the network typically ensures good hearability of the signals from multiple base stations.

Although described for PRS, the technology disclosed herein is not limited to PRS or any particular reference signal or positioning in general, neither to downlink or uplink. Other examples of signals can e.g. be cell-specific reference signals, sounding reference signals, synchronization signals, etc. Also, although described for QPSK, the disclosed main principles in the methodology are not limited to a particular modulation scheme. The techniques described herein apply to all time base methods, not just Long Term Evolution (LTE), whether uplink or downlink based. For example, the technology disclosed herein may apply to other radio access technologies such as LTE TDD, LTE FDD, LTE evolutions, WiMAX, and WLAN. The proposed solution is thus relevant for signal detection in general. Moreover, the technology and embodiments described herein also apply to any measurement techniques, e g, timing measurements such as RSTD derived from time of arrival measurement performed using the adaptive threshold.

The reference signal time difference (RSTD) is a time difference of arrival between reference signals from two different base stations. The RSTD can be calculated by computing the difference of two time of arrival measurements (each determined using Equation 11). For example, the reference signal time difference (RSTD) may be a relative timing difference between the neighbour cell j and the reference cell i, defined as $T_{SubframeRxj} - T_{SubframeRxi}$, where: $T_{SubframeRxj}$ is the time when the UE receives the start of one subframe from cell j $T_{SubframeRxi}$ is the time when the UE receives the corresponding start of one subframe from cell i that is closest in time to the subframe received from cell j. The reference point for the observed subframe time difference is taken as the antenna connector of the UE. See, e.g., 3GPP TS 36.214, section 5.1.12.

Although the description above contains many specificities, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

What is claimed is:

1. A wireless device which receives a reference signal over a radio channel from a wireless transmitter, the wireless device comprising:
    a correlator configured to use a signal received from the radio channel and a replica of the reference signal to provide a correlator output value indicating a cross-correlation with the signal received from the radio channel and the replica of the reference signal;
    a detector configured to compare the correlator output value with a threshold value to detect presence of a reference signal; and
    a threshold selector configured to adapt the threshold value to at least an estimate of a relative amount of noise and interference power in the received signal.

2. The apparatus of claim 1, further comprising an electronic circuit configured to include the correlator, the detector, and the threshold selector.

3. The apparatus of claim 1, wherein the detector is further configured to estimate an arrival time of the reference signal.

4. The apparatus of claim 1, wherein the detector is further configured to obtain a reference signal time difference (RSTD) measurement based on a time difference of arrival between reference signals from two different base stations.

5. The apparatus of claim 1, further comprising a reference signal analyzer configured to use at least the reference signal to determine a geographical location of the wireless device.

6. The apparatus of claim 1, wherein the wireless device is configured to send reference signal time difference (RSTD) measurements to an Evolved-Serving Mobile Location Center (E-SMLC) using a Long-Term Evolution (LTE) Positioning Protocol (LPP) protocol.

7. The apparatus of claim 1, wherein the reference signal is a positioning reference signal (PRS).

8. The apparatus of claim 1, wherein the correlator is configured to perform a cross correlation in a time domain and wherein the correlator is further configured to use the cross correlation to derive the correlator output value.

9. The apparatus of claim 1, wherein the correlator is configured to perform a cross correlation in a frequency domain and wherein the correlator is further configured to use the cross correlation to derive the correlator output value.

10. The apparatus of claim 9, wherein the correlator comprises:
    an element wise multiplication unit configured to use the delayed output signal in the frequency domain and the complex conjugated replica of the reference signal in the frequency domain to provide a frequency domain product;
    a coherent accumulation unit configured to perform complex addition of the frequency domain product to provide a summed frequency domain product,
    an Inverse Fast Fourier Transform (IFFT) configured to convert the summed frequency domain product to a time domain summed product; and
    a non-coherent accumulation unit configured to use the time domain summed product to provide a correlator output.

11. The apparatus of claim 1, the threshold selector is configured to adapt the threshold value to the at least the estimate of the relative amount of noise and interference power in the received signal by performing an interpolation between a pure noise threshold and a pure interference threshold.

12. The apparatus of claim 11, the threshold selector is configured to perform the interpolation as a linear interpolation or as an interpolation in the logarithmic domain.

13. The apparatus of claim 11, wherein the pure noise threshold is dependent upon an inverse of the cumulative distribution function $\chi^2(2M)$ at a $1-P_{fa}$ level, where M is an integer number of OFDM segments of the reference signal and where $P_{fa}$ is a false alarm value.

14. The apparatus of claim 11, wherein the pure interference threshold is dependent upon an expression $$\lambda^* = \frac{1}{2M} F_{QPSK}^{-1}(1 - P_{fa}; M, N_1, N_2, N_c),$$

where M is an integer number of OFDM segments of the reference signal, each segment consisting of $N_c$ number of OFDM symbols, wherein $N_c$ is an integer accumulation length of the reference signal, wherein $N_1$ is the total number of PRS symbols from subcarriers containing one PRS symbol per subframe, wherein $N_2$ denote the total number of PRS symbols from subcarriers containing two PRS symbol per subframe, wherein $F_{QPSK}(1-P_{fa};M,N_1.N_2,N_c)$ is a cumulative density function dependent upon $(1-P_{fa})$, and wherein $P_{fa}$ is a false alarm value.

15. The apparatus of claim 1, the threshold selector is configured to adapt the threshold value to the at least the estimate of the relative amount of noise and interference power in the received signal by performing a noise-weighted interpolation between a pure noise threshold and a pure interference threshold using at least an estimate of a noise weight factor.

16. The apparatus of claim 15, wherein the threshold selector is configured to determine the at least an estimate of the noise weight factor based on at least an estimate of a normalized fourth moment of the channel-propagated signal from the radio channel.

17. The apparatus of claim 1, the threshold selector is configured to adapt the threshold value to the at least the estimate of the relative amount of noise and interference power in the received signal by scaling and convolving a quantized Gaussian distribution with a scaled binomial distribution.

18. A method of operating a wireless device which receives a reference signal over a radio channel from a transmitter, the method comprising:
(1) using a signal received from the radio channel and a replica of the reference signal to provide a correlator output value indicating a cross-correlation with the signal received from the radio channel and the replica of the reference signal;
(2) comparing the correlator output value with a threshold value to detect presence of a reference signal;
(3) adapting the threshold value to at least an estimate of a relative amount of noise and interference power in the received signal.

19. The method of claim 18, further using an electronic circuit to perform acts (1)-(3).

20. The method of claim 18, further comprising estimating an arrival time of the reference signal.

21. The method of claim 18, further comprising using at least the reference signal to determine a geographical location.

22. The method of claim 18, further comprising performing a cross correlation in a time domain and using the cross correlation to derive the correlator output value.

23. The method of claim 18, further comprising performing a cross correlation in a frequency domain and using the cross correlation to derive the correlator output value.

24. The method of claim 23, further comprising:
using the delayed output signal in the frequency domain and the complex conjugated replica of the reference signal in the frequency domain to provide a frequency domain product;
performing complex addition of the frequency domain product to provide a summed frequency domain product,
converting the summed frequency domain product to a time domain summed product; and,
using the time domain summed product to provide a correlator output.

25. The method of claim 18, further comprising adapting the threshold value to the at least the estimate of the relative amount of noise and interference power in the received signal by performing an interpolation between a pure noise threshold and a pure interference threshold.

26. The method of claim 25, further comprising performing the interpolation as a linear interpolation or as an interpolation in the logarithmic domain.

27. The method of claim 25, wherein the pure noise threshold is dependent upon an inverse of the cumulative distribution function $\chi^2(2M)$ at a $1-P_{fa}$ level, where M is an integer number of OFDM segments of the reference signal, and where $P_{fa}$ is a false alarm value.

28. The method of claim 18, further comprising adapting the threshold value to the at least the estimate of the relative amount of noise and interference power in the received signal by performing a noise-weighted interpolation between a pure noise threshold and a pure interference threshold using at least an estimate of a noise weight factor.

29. The method of claim 28, further comprising determining the at least an estimate of the noise weight factor based on at least an estimate of a normalized fourth moment of the channel-propagated signal from the radio channel.

30. The method of claim 18, wherein the pure interference threshold is dependent upon an expression $$\lambda^* = \frac{1}{2M} F_{QPSK}^{-1}(1 - P_{fa}; M, N_1, N_2, N_c),$$

where M is an integer number of OFDM segments of the reference signal, each segment consisting of $N_c$ number of OFDM symbols, wherein $N_c$ is an integer accumulation length of the reference signal, wherein $N_1$ is the total number of PRS symbols from subcarriers containing one PRS symbol per subframe, wherein $N_2$ denote the total number of PRS symbols from subcarriers containing two PRS symbol per subframe, wherein $F_{QPSK}(1-P_{fa};M,N_1.N_2,N_c)$ is a cumulative density function dependent upon $(1-P_{fa})$, and wherein $P_{fa}$ is a false alarm value.

31. The method of claim 18, further comprising adapting the threshold value to the at least the estimate of the relative amount of noise and interference power in the received signal by scaling and convolving a quantized Gaussian distribution with a scaled binomial distribution.

* * * * *

UNITED STATES PATENT AND TRADEMARK OFFICE
CERTIFICATE OF CORRECTION

PATENT NO. : 8,134,990 B2  
APPLICATION NO. : 12/961037  
DATED : March 13, 2012  
INVENTOR(S) : Kangas et al.

It is certified that error appears in the above-identified patent and that said Letters Patent is hereby corrected as shown below:

In Column 11, Line 23, delete "positioning)" and insert -- positioning). --, therefor.

In Column 12, Line 2, delete "$Y_1(\mu)$" and insert -- $Y_1(\mu)$ --, therefor.

In Column 12, Line 9, delete "$s_1*(-k)$" and insert -- $s_1*(-k)$ --, therefor.

In Column 12, Line 55, delete "$e_1(k)$" and insert -- $e_1(k)$ --, therefor.

In Column 15, Line 57, delete "$S_1(\mu)$," and insert -- $S_1(\mu)$, --, therefor.

In Column 15, Line 57, delete "$|S_1(\mu)|$" and insert -- $|S_1(\mu)|$ --, therefor.

In Column 19, Line 10, delete " $\sqrt{2}/2N_1+N_2))$. " and insert -- $\sqrt{2}/2N_c)(2N_1+N_2))$ . --, therefor.

In Column 19, Line 18, delete "$2N_1N_2$," and insert -- $2N_1+N_2$, --, therefor.

In Column 20, Line 65, delete "M." and insert -- M, --, therefor.

In Column 21, Line 35, delete "to." and insert -- $t_0$. --, therefor.

In Column 23, Line 35, delete "e g," and insert -- e.g., --, therefor.

In Column 24, Line 55, in Claim 10, delete "product," and insert -- product; --, therefor.

In Column 25, Line 24, in Claim 14, delete "$N_1.N_2,N_c)$" and insert -- $N_1,N_2,N_c)$ --, therefor.

In Column 26, Lines 13-14, in Claim 24, delete "product," and insert -- product; --, therefor.

In Column 26, Line 56, in Claim 30, delete "$N_1.N_2,N_c)$" and insert -- $N_1,N_2,N_c)$ --, therefor.

Signed and Sealed this  
Tenth Day of July, 2012

David J. Kappos  
*Director of the United States Patent and Trademark Office*